(12) United States Patent  
Takayama

(10) Patent No.: US 8,498,441 B2
(45) Date of Patent: Jul. 30, 2013

(54) ELECTRONIC DEVICE

(75) Inventor: Masayuki Takayama, Kanagawa (JP)

(73) Assignee: Kyocera Corporation, Kyoto (JP)

(*) Notice: Subject to any disclaimer, the term of this patent is extended or adjusted under 35 U.S.C. 154(b) by 440 days.

(21) Appl. No.: 12/602,486

(22) PCT Filed: May 30, 2008

(86) PCT No.: PCT/JP2008/060013
§ 371 (c)(1),
(2), (4) Date: Mar. 17, 2010

(87) PCT Pub. No.: WO2008/146912
PCT Pub. Date: Dec. 4, 2008

(65) Prior Publication Data
US 2010/0178962 A1 Jul. 15, 2010

(30) Foreign Application Priority Data

May 30, 2007 (JP) .................................. 2007-143154

(51) Int. Cl.
H04R 1/02 (2006.01)
H04R 25/00 (2006.01)
H04M 1/00 (2006.01)

(52) U.S. Cl.
USPC .................. 381/388; 381/150; 455/575.1

(58) Field of Classification Search
USPC ................... 381/388, 104, 107; 455/575.1
See application file for complete search history.

(56) References Cited

U.S. PATENT DOCUMENTS

2007/0201705 A1* 8/2007 Dorogusker et al. ......... 381/104
2007/0242838 A1 10/2007 Ichinose
2009/0305750 A1 12/2009 Tsuboi

FOREIGN PATENT DOCUMENTS

| JP | 10-039869 | 2/1998 |
| JP | 2003-032351 | 1/2003 |
| JP | 2003-283609 | 10/2003 |
| JP | 2004-064172 | 2/2004 |
| JP | 2006-067484 | 3/2006 |
| JP | 2006-311097 | 11/2006 |
| JP | 2007-065038 | 3/2007 |
| JP | 2007124332 | 5/2007 |

OTHER PUBLICATIONS

Decision to Grant a Patent for Japanese Patent Application No. 2007-143154, mailed Feb. 14, 2012, 4 pages (including English translation).
International Search Report for PCT/JP2008/060013, mailed on Jul. 22, 2008, 2 pages.

* cited by examiner

Primary Examiner — Curtis Kuntz
Assistant Examiner — Sunita Joshi
(74) Attorney, Agent, or Firm — Duane Morris LLP

(57) ABSTRACT

It is an objective of the present invention to provide an electronic device that includes an sound signal generating unit, and that can be placed on a cradle including a sound producing unit, in which a sound signal generated by the sound signal generating unit is output to the cradle such that the difference between the sound quality of sound produced from the electronic device and that of sound produced from the cradle is reduced.

10 Claims, 14 Drawing Sheets

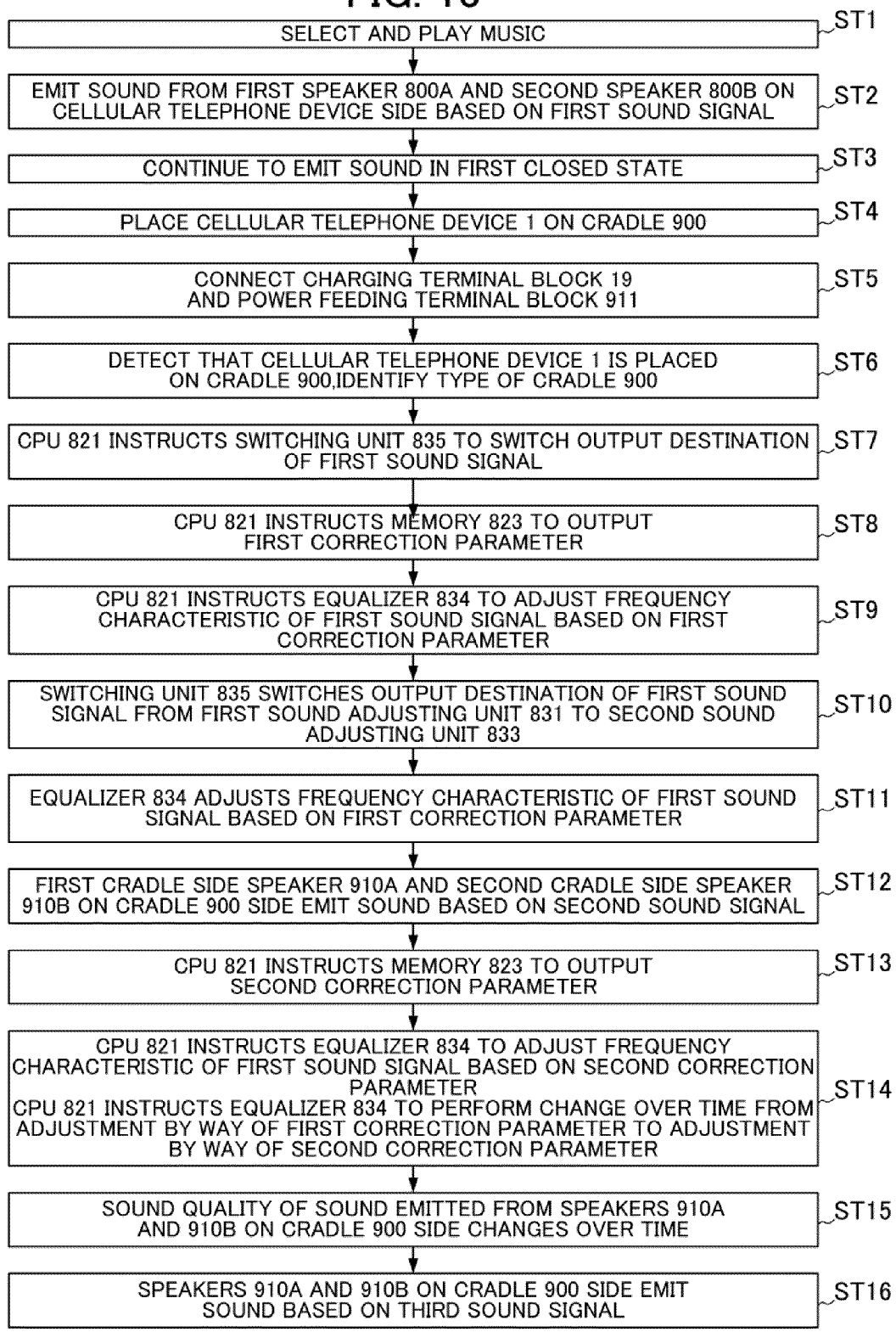

ELECTRONIC DEVICE

CROSS-REFERENCE TO RELATED APPLICATIONS

This is a US National Phase Application of International Application No. PCT/JP2008/060013 filed May 30, 2008, which claims priority to Japanese Patent Application No. 2007-143154 filed May 30, 2007, the disclosures of which are incorporated herein by reference in their entirety.

TECHNICAL FIELD

The present invention relates to an electronic device such as a cellular telephone device.

BACKGROUND ART

In recent years, opportunities for listening to music by utilizing a cellular telephone device as an electronic device are increasing. For example, in addition to listening to music by connecting earphones to a cellular telephone device, opportunities for listening to music by causing the speakers disposed in the cellular telephone device to emit sound are increasing. An equalizer being capable of adjusting the sound quality of sound emitted from the speakers to a desired sound quality is built into such a cellular telephone device. Moreover, in addition to listening to music in a state of carrying a cellular telephone device, opportunities for listening to music in the room in a state in which the cellular telephone device is placed on a cradle as a cradle for charging the battery accommodated in the cellular telephone device are also increasing.

Here, a cradle device having a function to play sound produced from a cellular telephone device (a main body of a communication device) has been proposed (for example, Patent Document 1). It is possible to switch the playback by way of outputting a sound signal, which has been output to a playing unit of the cellular telephone device (a main body of a communication device), to a playing unit of the cradle device. In this case, output characteristics are different between the playing unit such as speakers in the cellular telephone device and the playing unit such as speakers in the cradle; therefore, there has been a problem in that the sound quality of produced sound is different before and after switching the playback.

On the other hand, a technique is known for adjusting the sound quality of sound produced from a speaker by adjusting a frequency characteristic of a sound signal with an equalizer. For example, a sheet speaker system has been disclosed that is characterized in that a frequency characteristic of a sound signal is adjusted with an equalizer in order to provide an appropriate sound environment for each sheet speaker, while considering an effect of a sound output (sound signal) in another sheet disposed in the vicinity thereof.

Patent Document 1: Japanese Unexamined Patent Application, First Publication No. 2003-32351

Patent Document 2: Japanese Unexamined Patent Application, First Publication No. 2007-065038

DISCLOSURE OF THE INVENTION

Problems to be Solved by the Invention

Here, as described above, since the sound quality of sound produced from the playing unit such as the speakers in the cellular telephone device before changing the playback is different from the sound quality of sound produced from the playing unit such as the speakers in the cradle device after switching the playback, there have been cases where a listener such as a user feels discomfort.

It is an objective of the present invention to provide an electronic device that includes a sound signal generating unit, and that can be placed on a cradle including a sound producing unit, in which a sound signal generated by the sound signal generating unit is output to the cradle so that the difference between the sound quality of sound produced from the electronic device and the sound quality of sound produced from the cradle is reduced.

Means for Solving the Problems

The present invention relates to an electronic device, including: a body that can be placed on a cradle including a first sound producing unit that produces a predetermined sound based on a sound signal; a converter that converts sound data into a first sound signal; a second sound producing unit that produces a predetermined sound based on the first sound signal; a sound signal generating unit that generates a second sound signal based on the first sound signal; and an output unit that can be electrically connected to the cradle when the body is placed on the cradle, and that outputs the second sound signal to the cradle, in which the sound signal generating unit generates the second sound signal such that a sound quality of sound produced from the first sound producing unit approximates to a sound quality of sound produced from the second sound producing unit based on the first sound signal.

Moreover, the sound signal generating unit can generate the second sound signal such that the sound quality of sound produced from the first sound producing unit based on the second sound signal is substantially identical to the sound quality of sound produced from the second sound producing unit based on the first sound signal.

In addition, the sound signal generating unit can generate the second sound signal such that a low-pitched output in the first sound signal is reduced.

Furthermore, after the second sound signal is output to the first sound producing unit from the output unit, the sound signal generating unit can adjust the first sound signal and produces a third sound signal that is different from the second sound signal.

Moreover, the sound signal generating unit can adjust the first sound signal such that a change from the second sound signal to the third sound signal is step-wise or continuous.

In addition, the electronic device can further comprise a memory unit that stores characteristic correction data, and the sound signal generating unit can generate the second sound signal and the third sound signal by correcting the first signal based on the characteristic correction data stored in the memory unit.

Furthermore, the electronic device can further comprise an identifying unit that identifies a type of cradle on which the electronic device is placed, in which the memory unit stores characteristic correction data corresponding to at least one type of cradle, and in a case in which a type of cradle, on which the electronic device is placed, is identified by the identifying unit, the sound signal generating unit can generate the second sound signal and the sound signal by correcting the first signal based on the characteristic correction data, which is stored in the memory unit, and which corresponds to a type of cradle identified by the identifying unit.

Moreover, the electronic device can further comprise a detecting unit that is capable of detecting that the electronic device is placed on the cradle, and in a case in which the detecting unit detects that the electronic device is placed on the cradle, the sound signal generating unit can generate the second sound signal based on the first sound signal, the second sound producing unit stops producing sound based on the first sound signal, and the output unit starts output of the second sound signal to the cradle.

Effects of the Invention

According to the present invention, it is possible to provide an electronic device that includes a sound signal generating unit, and that can be placed on a cradle including a sound producing unit, in which a sound signal generated by the sound signal generating unit is output to the cradle so that the difference between the sound quality of sound produced from the electronic device and the sound quality of sound produced from the cradle is reduced.

BRIEF DESCRIPTION OF THE DRAWINGS

FIG. 13 shows a flowchart illustrating one aspect of operation of the sound system S1.

EXPLANATION OF REFERENCE NUMERALS

Figure 1:
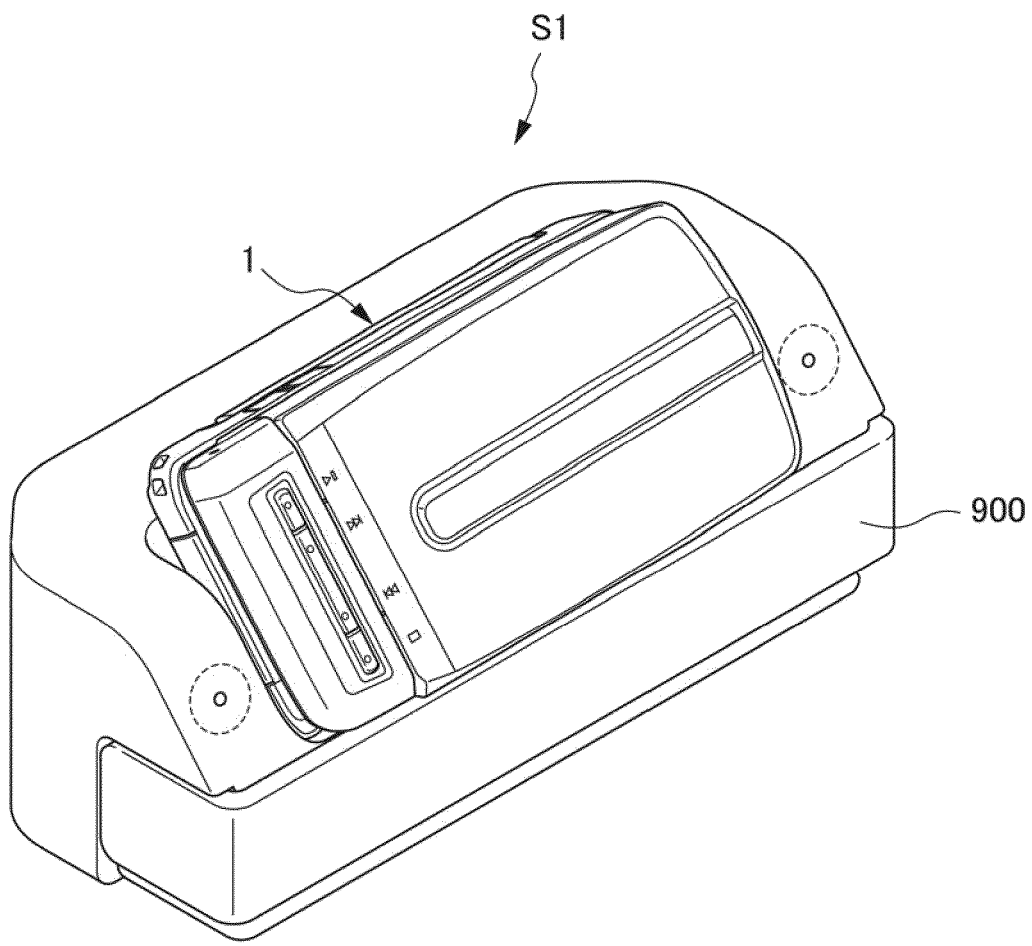
FIG. 1 shows a perspective view of a sound system S1.

S1 sound system
1 cellular telephone device
2 operation unit side body
3 display unit side body
11 operation key set
19 charging terminal block
800A first speaker
800B second speaker
821 CPU
823 memory
825 decoder
827 sensor
831 first sound adjusting unit
833 second sound adjusting unit
834 equalizer
900 cradle
910A first cradle side speaker
910B second cradle side speaker

PREFERRED MODE FOR CARRYING OUT THE INVENTION

A preferred embodiment for carrying out the present invention is hereinafter described with reference to the drawings. It should be noted that, although a cellular telephone device is hereinafter described as an electronic device, the electronic device of the present invention is not limited thereto, and it may be PHS (Personal Handyphone System), PDA (Personal Digital Assistant), a portable navigation device, a notebook PC or the like. Moreover, although a cradle is described as a cradle for charging, the cradle of the present invention is not limited thereto, and it may be a cradle without a charging function.

A basic structure in a sound system S1 is described with reference to FIG. 1. FIG. 1 shows a perspective view of the sound system S1.

As shown in FIG. 1, the sound system S1 in the present embodiment includes: a cellular telephone device 1 as an electronic device; and a cradle 900 for charging. The cellular telephone device 1 can be placed on the cradle 900. More specifically, the cellular telephone device 1 is placed such that the longitudinal direction thereof is in the horizontal direction, and one of the side faces in the lateral direction thereof (an elongated side face disposed on the bottom side in FIG. 1) abuts the cradle 900. Moreover, the cellular telephone device 1 is placed on the cradle 900 such that one of the large faces of the cellular telephone device 1 abuts the cradle 900. A detailed configuration of the cellular telephone device 1 and the cradle 900 is hereinafter described.

Figure 2:
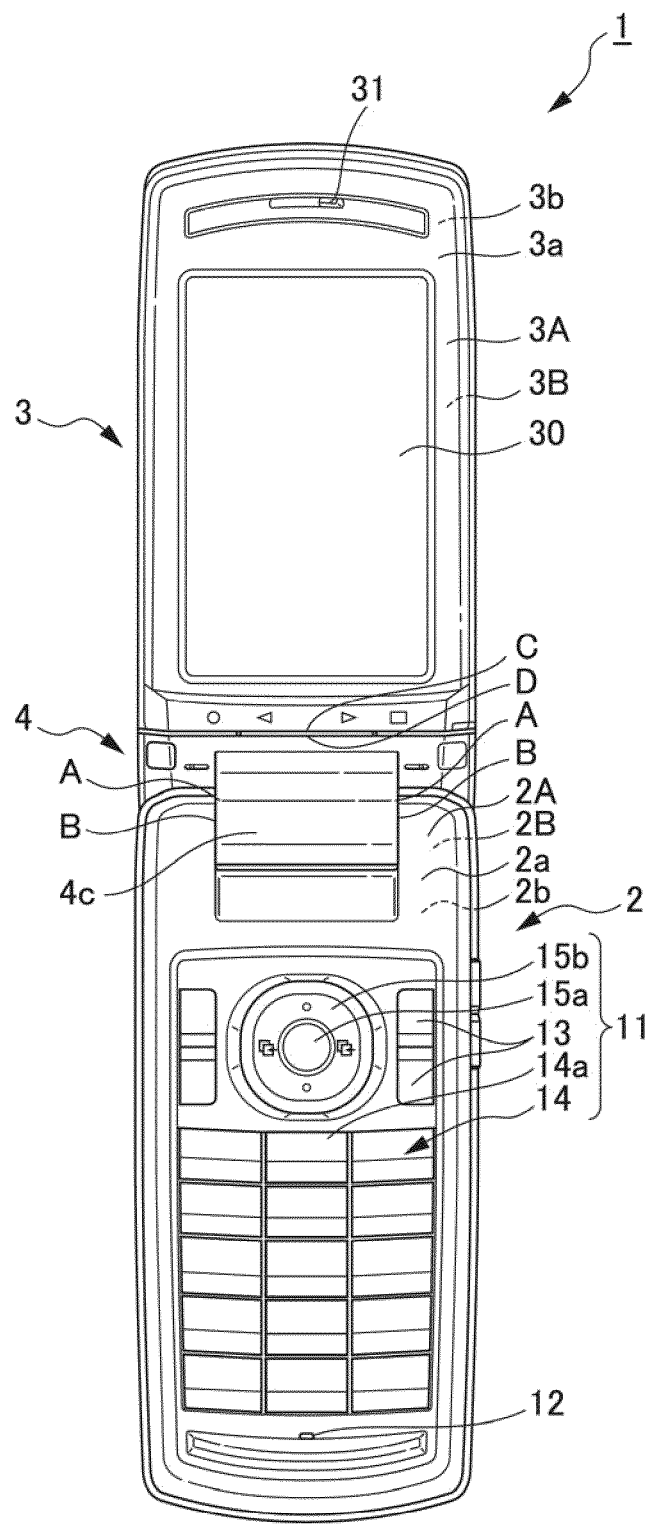
FIG. 2 shows a front view of a state in which a cellular telephone device 1 is opened (a first opened state)
Figure 3A:
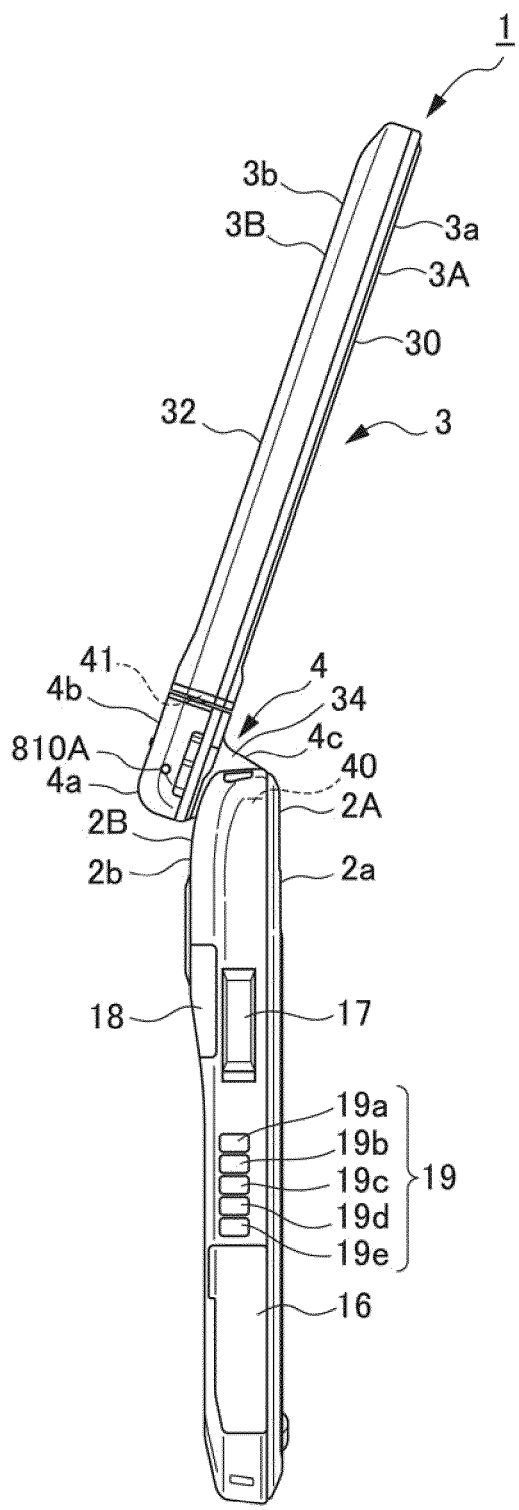
FIG. 3A shows a left side view of a state in which the cellular telephone device 1 is opened.
Figure 3B:
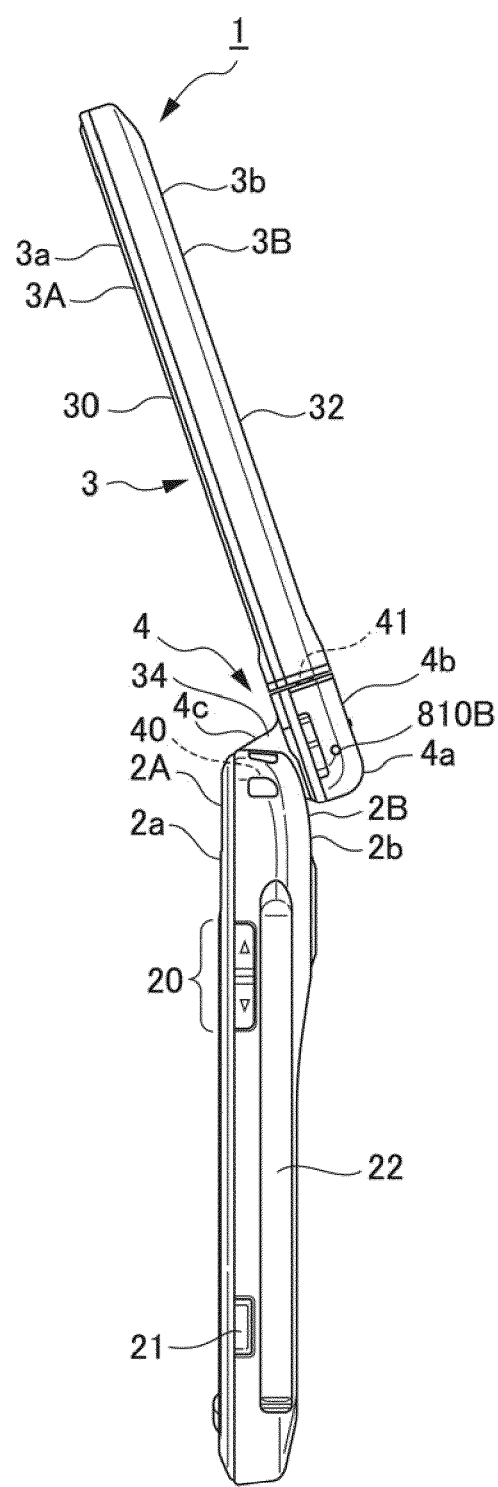
FIG. 3B shows a right side view of a state in which the cellular telephone device 1 is opened.
Figure 4:
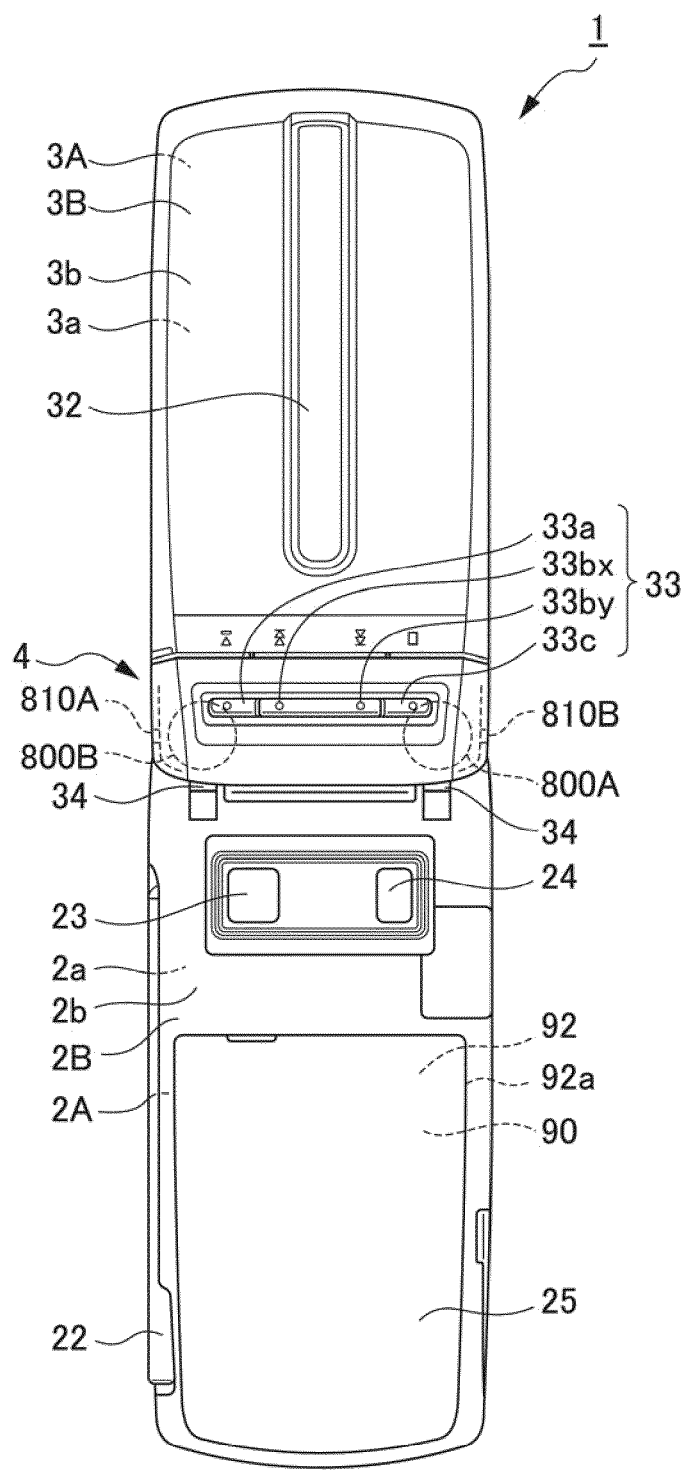
FIG. 4 shows a rear view of a state in which the cellular telephone device 1 is opened.

A basic structure of the cellular telephone device 1 as an electronic device is described with reference to FIGS. 2 to 4. FIG. 2 shows a front view of a state in which the cellular telephone device 1 is opened (a first opened state). Moreover, FIG. 3A shows a left side view of a state in which the cellular telephone device 1 is opened, and FIG. 3B shows a right side view of a state in which the cellular telephone device 1 is opened. In addition, FIG. 4 shows a rear view of a state in which the cellular telephone device 1 is opened.

The cellular telephone device 1 includes an operation unit side body 2 and a display unit side body 3. The operation unit side body 2 and the display unit side body 3 are connected via a connecting portion 4 including a 2-axis hinge mechanism. The connecting portion 4 (2-axis hinge mechanism) can transform the cellular phone 1 into an opened state and a closed state, and can switch the display unit side body 3 between a front side state and a back side state in each of the opened state and the closed state.

Here, the closed state is a state in which both bodies are disposed so as to be mutually superimposed, and the opened state is a state in which both bodies are disposed so as not to be mutually superimposed. The front side state in the opened state is a state in which a display 30 disposed on a surface 3A in the display unit side body 3 to be described later and an operation key set 11 disposed in a front surface 2A in the operation unit side body 2 are disposed so as to face the same side. Furthermore, the back side state in the opened state is a state in which the display 30 in the display unit side body 3 and the operation key set 11 in the operation unit side body 2 are disposed so as to face opposite sides from each other. Moreover, the front side state in the closed state is a state in which the display 30 in the display unit side body 3 is disposed so as to face the operation key set 11 in the operation unit side body 2. In addition, the back side state in the closed state is a state in which the display 30 in the display unit side body 3 is disposed so as to be exposed and not face the operation key set 11 in the operation unit side body 2.

An outer surface of the operation unit side body 2 is configured with a front case 2a and a rear case 2b. The operation unit side body 2 is configured to expose, on the front case 2a side, both the operation key set 11 and a sound input unit 12 into which the sound of the user of the cellular telephone device 1 is input when conversing. Here, the operation key set 11 is configured with: function setting operation keys 13 for operating various functions such as for various settings, a telephone number directory function and a mail function; input operation keys 14 such as ten keys for inputting digits of a telephone number and characters for mail, and a selection operation key 15 for performing selection of various operations and scrolling up, down, left and right. Moreover, the sound input unit 12 is disposed to an outer end side that is opposite to the connecting portion 4 side in a longitudinal direction of the operation unit side body 2. In other words, the sound input unit 12 is disposed to an outer end side of the cellular telephone device 1 in the opened state.

Predetermined functions are assigned (key assignment) to each key configuring the operation key set 11 in accordance with a transformation state such as the opened/closed state and the front/back side state of the operation unit side body 2 and the display unit side body 3, and the type of application that is running. An operation corresponding to a function assigned to each key is executed by the user depressing each key configuring the operation key set 11 of the cellular telephone device 1.

As shown in FIG. 3A, an interface 16 for transmitting and receiving data to and from an external device (for example, a host device), a headphone/microphone terminal 17, a detachable external memory interface 18, and a charging terminal block 19 for recharging a battery are provided on one side of the operation unit side body 2. It should be noted that the interface 16, the headphone/microphone terminal 17 and the interface 18 are covered with a detachable cap to protect from dust when not in use. In addition, the charging terminal block19 is configured with a charging terminal 19a, a grounding terminal 19b, sound signal output terminals 19c and 19d as an output unit, and a control data output terminal 19e for outputting control data from a CPU 821 to be described later. Here, a sensor 827 (not illustrated in FIG. 3A) as a detecting unit and an identifying unit detects that the cellular telephone device 1 is placed on the cradle 900, and identifies a type of the cradle 900.

As shown in FIG. 3B, a pair of side keys 20, an operation key 21 used when capturing an image, and an antenna 22 for receiving a broadcast wave, in which a reception angle of waves can be adjusted, are provided on another side of the operation unit side body 2. Predetermined functions are assigned (key assignment) to the side keys 20 in accordance with a transformation state such as the opened/closed state and the front/back side state of the operation unit side body 2 and the display unit side body 3, and the type of application that is running. Here, similarly to the aforementioned case, an operation corresponding to a function assigned to the side keys 20 in the cellular telephone device 1 is executed by the user depressing the side keys 20.

As shown in FIG. 4, a camera unit 23 that takes an image of a subject and a light unit 24 that irradiates light on the subject are disposed so as to be exposed in the rear case 2b of the operation unit side body 2. The camera unit 23 and the light unit 24 are disposed at the connecting portion 4 side in the operation unit side body 2. Moreover, an opening 92a for mounting a battery 90 in a battery accommodating portion 92 is formed in the rear case 2b of the operation unit side body 2, and a battery lid 25 is disposed so as to cover the opening 92a.

In addition, as shown in FIGS. 2 to 4, an upper end portion of the operation unit side body 2 and a lower end portion of the display unit side body 3 are connected by the connecting portion 4 including the 2-axis hinge mechanism. As shown in FIG. 4, a secondary operation key set 33 is disposed on one surface (rear surface) of the connecting portion 4 in a row in a width direction (lateral direction) of the cellular telephone device 1. The secondary operation key set 33 is configured with a first key 33a, a second key 33b, and a third key 33c. The second key has a first portion 33bx and a second portion 33by. Predetermined functions are assigned (key assignment) to each key configuring the secondary operation key set 33 in accordance with a transformation state such as the opened/closed state and the front/back side state of the operation unit side body 2 and the display unit side body 3, and the type of application that is running. An operation corresponding to a function assigned to each key is executed by the user depressing each key configuring the operation key set 11 of the cellular telephone device 1. For example, each key configuring the secondary operation key set functions as a forward selection key or a backward selection key for selecting music in a case of a music play mode, and functions as a fast forward key or a rewind key in a state in which music is being played. As a specific way of assignment, the first key 33a is assigned a play function, the second key 33b is assigned a forward selection function (the first portion 33bx) and a backward selection function (the second portion 33by), and the third key 33c is assigned a stop function. In a state in which music is being played, the first key 33a is assigned a play function (including restarting from a stopped state), the second key is assigned a fast forwarding function (the first portion 33bx) and a rewinding function (the second portion 33by), and the third key is assigned a stop function.

An outer surface of the display unit side body 3 is configured with a front case 3a and a rear case 3b. The display 30 of a predetermined shape for displaying a variety of information and a sound output unit 31 for outputting the sound of the other party of the conversation are disposed so as to be exposed on the front case 3a of the display unit side body 3. In addition to a variety of character information, image information such as a TV image and a photographic image is displayed on the display 30. Here, the sound output unit 31 is disposed at an outer end side that is opposite to the connecting portion 4 in the longitudinal direction of the display unit side body 3. In other words, the sound output unit 31 is disposed at another outer end side of the cellular telephone device 1 in the opened state.

Moreover, a sub-display 32 for displaying a variety of information is disposed so as to be exposed on the rear case 3b of the display unit side body 3. Character information such as music information is mainly displayed on the sub display 32. Each of the display 30 and the sub-display 32 is configured with a liquid crystal display panel, a drive circuit that drives the liquid crystal display panel, and a light source unit such as a backlight that irradiates light from the back surface side of the liquid crystal display panel.

Figure 5:
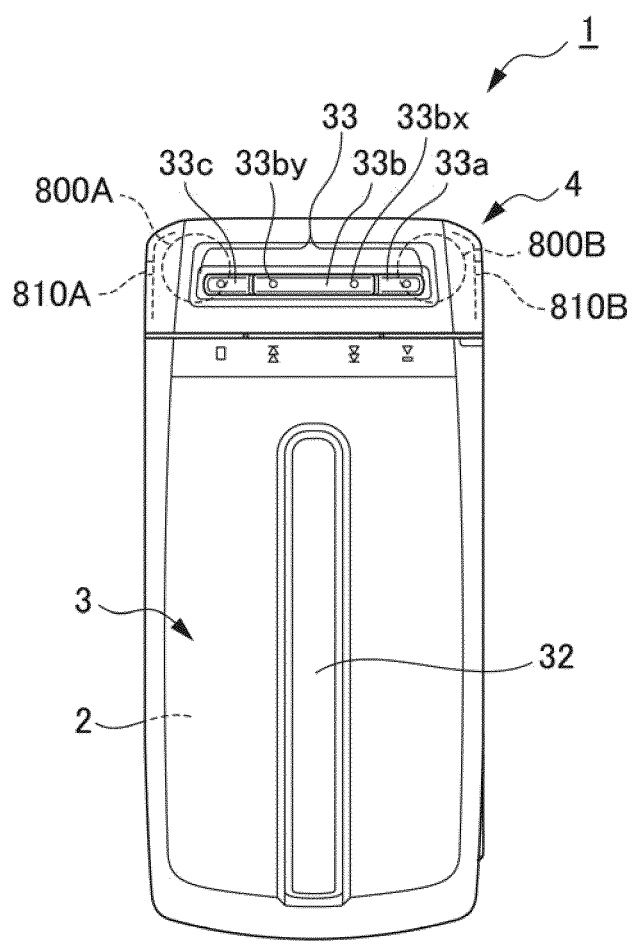
FIG. 5 shows a front view of a state in which the display unit side body 3 of the cellular telephone device 1 is folded about an opening-and-closing axis X of a connecting portion 4 from the state shown in FIG. 1.
Figure 6:
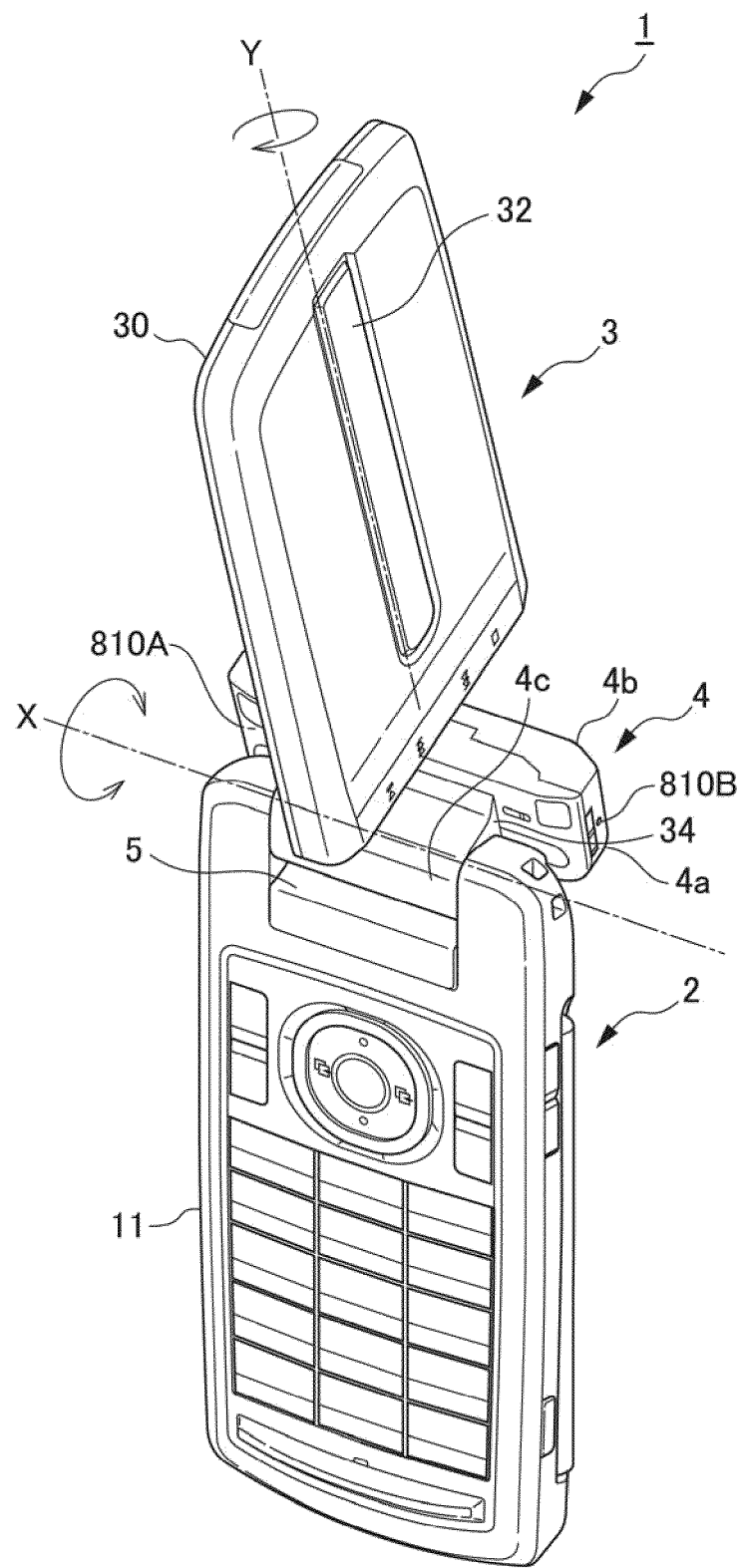
FIG. 6 shows a perspective view of a state in which the display unit side body 3 of the cellular telephone device 1 is pivoted a predetermined angle about a pivot axis Y of the connecting portion 4 from the state shown in FIG. 1.
Figure 7:
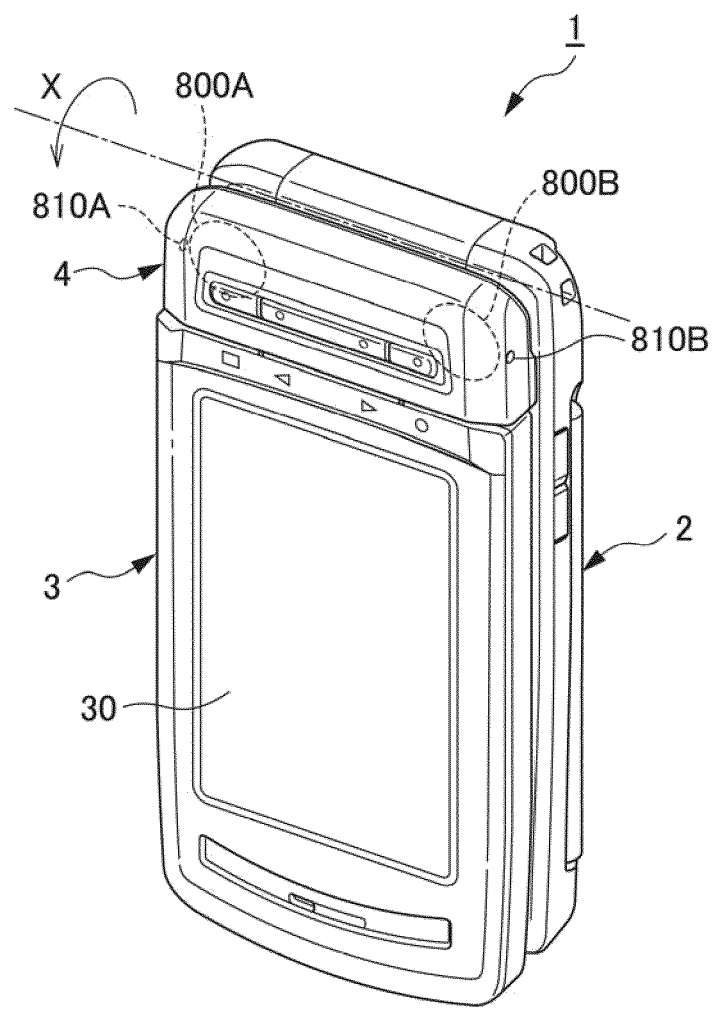
FIG. 7 shows a perspective view of a state in which the display unit side body 3 is pivoted 180 degrees about the pivot axis Y from the state shown in FIG. 5.

Next, a structure of the connecting portion 4 and transformation states of the cellular telephone device 1 are described with reference to FIGS. 5 to 7. FIG. 5 shows a front view of a state in which the display unit side body 3 of the cellular telephone device 1 is folded about an opening-and-closing axis X of the connecting portion 4 from the state shown in FIG. 1. FIG. 6 shows a perspective view of a state in which the display unit side body 3 of the cellular telephone device 1 is pivoted a predetermined angle about a pivot axis Y of the connecting portion 4 from the state shown in FIG. 1. FIG. 7 shows a perspective view of a state in which the display unit side body 3 is pivoted 180 degrees about the pivot axis Y from the state shown in FIG. 5.

The connecting portion 4 is connected to an upper end portion of the operation unit side body 2 in one end 4a side by way of an opening-and-closing connecting member, and is connected to a lower end portion of the display unit side body 3 in another end 4b side by way of a pivoting connecting member.

An opening-and-closing portion 4c of a convex shape, which is formed so as to protrude perpendicularly from a surface of the connecting portion 4, is formed in the one end 4a of the connecting portion 4. In the upper end portion of the operation unit side body 2, a notch portion 5 of a concave shape is formed, into which the opening-and-closing portion 4c of a convex shape is fitted by insertion.

A hole A is formed in each side of the opening-and-closing portion 4c in the opening-and-closing axis X direction. Moreover, a hole B is formed in each inner surface of the notch portion 5 of the operation unit side body 2. In a state in which the opening-and-closing portion 4c of a convex shape is fitted by insertion into the notch portion 5 of a concave shape, the hole A and the hole B are disposed so as to adjacently face each other, while the opening-and-closing connecting member of a cylindrical shape is passed through both of the holes A and the holes B. As a result, the operation unit side body 2 and the connecting portion 4 are connected so as to be openable and closable. Here, one end of the opening-and-closing member of a cylindrical shape is formed to be hollow such that wiring from the inside of the operation unit side body 2 can be passed therethrough.

It should be noted that the opening-and-closing portion 4c is not particularly limited to a convex shape as long as the shape may be fitted by insertion into the upper end portion of the operation unit side body 2, and the shape of the upper end portion of the operation unit side body 2 is also not limited to a concave shape.

In addition, the other end 4b side of the connecting portion 4 and the lower end portion of the display unit side body 3 are connected so as to pivot freely by way of the pivoting connecting member. A hole C is formed on a side face of the connecting portion 4 on the display unit side body 3 side. Moreover, a hole D is formed on a side face of the display unit side body 3 on the connecting portion 4 side. The pivoting connecting member is passed through both the hole C and the hole D, thereby connecting the operation unit side body 2 and the display unit side body 3 so as to be pivotable about the pivot axis Y. In other words, the operation unit side body 2 and the display unit side body 3 are connected so as to enable switching between the front side state and the back side state of the display unit side body 3.

As described above, in the cellular telephone device 1, the operation unit side body 2 and the display unit side body 3 are connected to be openable/closable and pivotable by way of the connecting portion 4. In this way, the cellular telephone device 1 can be transformed into a variety of states by opening or closing the operation unit side body 2 and the display unit side body 3 about the opening-and-closing axis X, and by pivoting the bodies about the pivot axis Y.

For example, in the cellular telephone device 1 in the closed state (first closed state) shown in FIG. 5 in which the operation unit side body 2 and the display unit side body 3 are mutually superimposed, by opening the bodies such that the end portions of the operation unit side body 2 and the display unit side body 3 opposite to the opening-and-closing axis X are disengaged from each other, the cellular telephone device 1 can be transformed into the opened state (first opened state) shown in FIGS. 2 to 4 in which the operation unit side body 2 and the display unit side body 3 are not mutually superimposed.

Conversely, in the cellular telephone device 1 in the opened state (first opened state), by closing the bodies such that the end portions of the operation unit side body 2 and the display unit side body 3 opposite to the opening-and-closing axis X approach each other, the cellular telephone device 1 can be transformed into the closed state (first closed state) shown in FIG. 5.

In addition, as shown in FIG. 6, the display unit side body 3 can be pivoted about the pivot axis Y. Furthermore, by further pivoting the display unit side body 3 about the pivot axis Y from the state in FIG. 6, the display unit side body 3 can be switched between the front side state and the back side state. More specifically, the display unit side body 3 is pivoted 180 degrees about the pivot axis Y, thereby making it possible to switch from the opened state (first opened state) shown in FIGS. 2 to 4 in which the display 30 disposed on the surface 3A in the display unit side body 3 and the operation key set 11 disposed on the surface 2A in the operation unit side body 2 face the same side, to an opened state (second opened state) in which the display 30 disposed on the surface 3A in the display unit side body 3 and the operation key set 11 disposed on the surface 2A in the operation unit side body 2 face opposite sides.

In addition, by closing the display unit side body 3 in the second opened state about the opening-and-closing axis X, the cellular telephone device 1 can be transformed into the closed state (second closed state) shown in FIG. 7. In other words, the cellular telephone device 1 can be transformed from the closed state (first closed state) shown in FIG. 5, in which the display 30 in the display unit side body 3 is disposed so as to face the operation key set 11 in the operation unit side body 2, to the closed state (second closed state, or turned-and-closed state) shown in FIG. 7, in which the display 30 in the display unit side body 3 is exposed without facing the operation unit side body 2.

Here, as shown in FIGS. 4 to 7, a first speaker 800A and a second speaker 800B as a second sound producing unit are accommodated and disposed in the connecting portion 4. The first speaker 800A and the second speaker 800B are accommodated and disposed in both sides of the connecting portion 4, respectively, in the width direction of the cellular telephone device 1.

In addition, on the side faces in the width direction of connecting portion 4, a first speaker hole 810A is formed on the side face on the first speaker 800A side, and a second speaker hole 810B is formed on the side face on the second speaker 800B side. The first speaker hole 810A emits sound from the first speaker 800A to the outside, and the second speaker hole 810B emits sound from the second speaker 800B to the outside.

Stereophonic playback is possible by playing the sound of two different sound channels from the first speaker 800A and the second speaker 800B, respectively. In this case, as shown in FIGS. 2 to 5, the cellular telephone device 1 is placed (vertically arranged) such that the longitudinal direction thereof is parallel with the vertical direction, and the first speaker 800A and the second speaker 800B are caused to play the sound of two different sound channels, respectively. In other words, stereophonic playback is performed by placing the cellular telephone device 1 such that the first speaker 800A and the second speaker 800B are aligned in the horizontal direction.

Here, each of the first speaker 800A and the second speaker 800B produces a predetermined sound based on a sound signal that has been decoded by a decoder 825 as a converter from sound data that is output from memory 823 to be described later. States of emission of sound from the first speaker 800A and the second speaker 800B are controlled by the CPU 821.

It should be noted that, although the cellular telephone device 1 is described as being foldable by the connecting portion 4 in the present embodiment, instead of such a flip type, the cellular telephone device 1 may be of: a slider type in which one body slides to one direction from a state in which the operation unit side body 2 and the display unit side body 3 are mutually superimposed; a rotating type (revolving type) in which one body is rotated around an axis line along the direction in which the operation unit side body 2 and the display unit side body 3 are superimposed; or a type (straight type) in which the operation unit side body 2 and the display unit side body 3 are disposed in a single body without a connecting portion.

Figure 8:
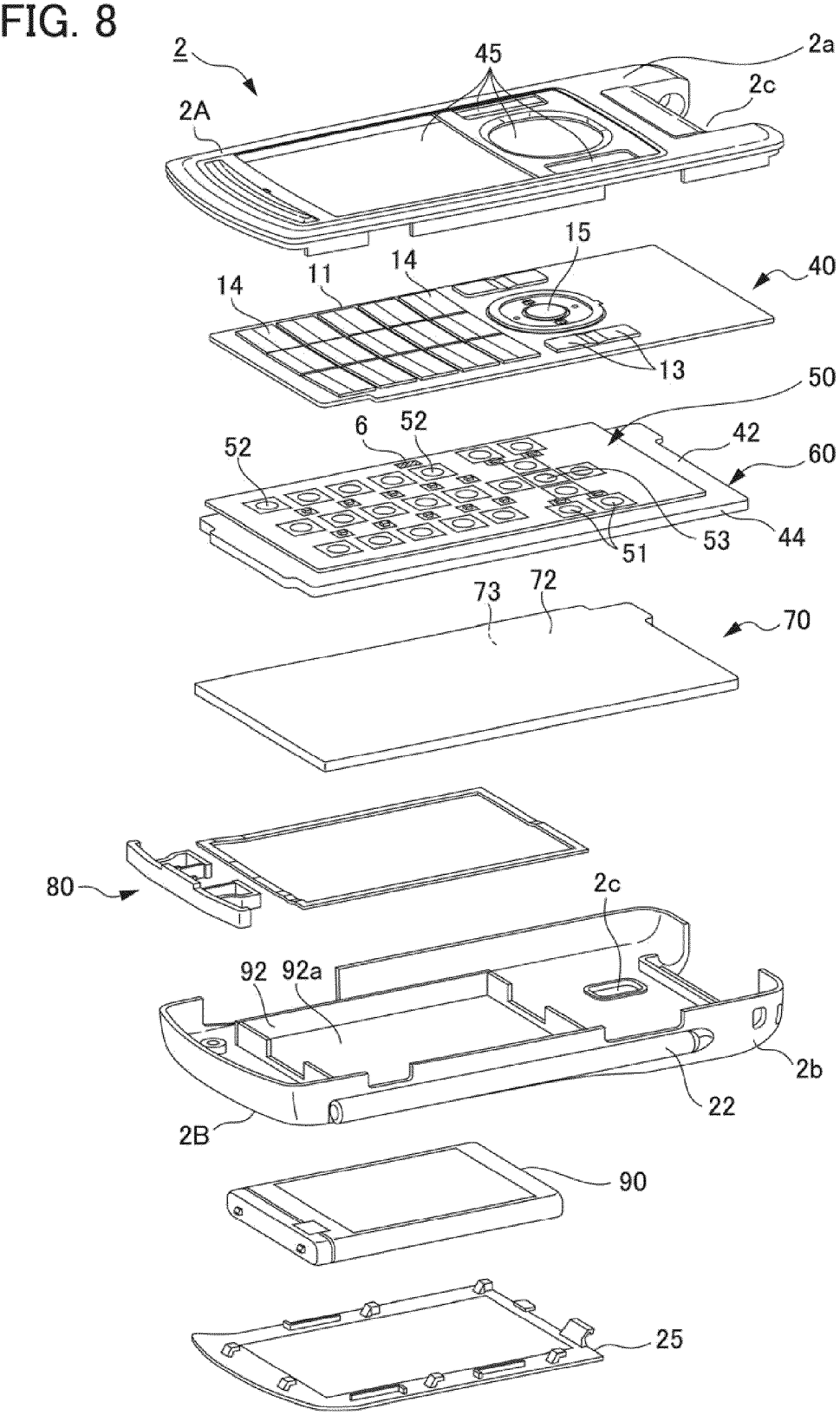
FIG. 8 shows an exploded perspective view of the operation unit side body 2.
Figure 9:
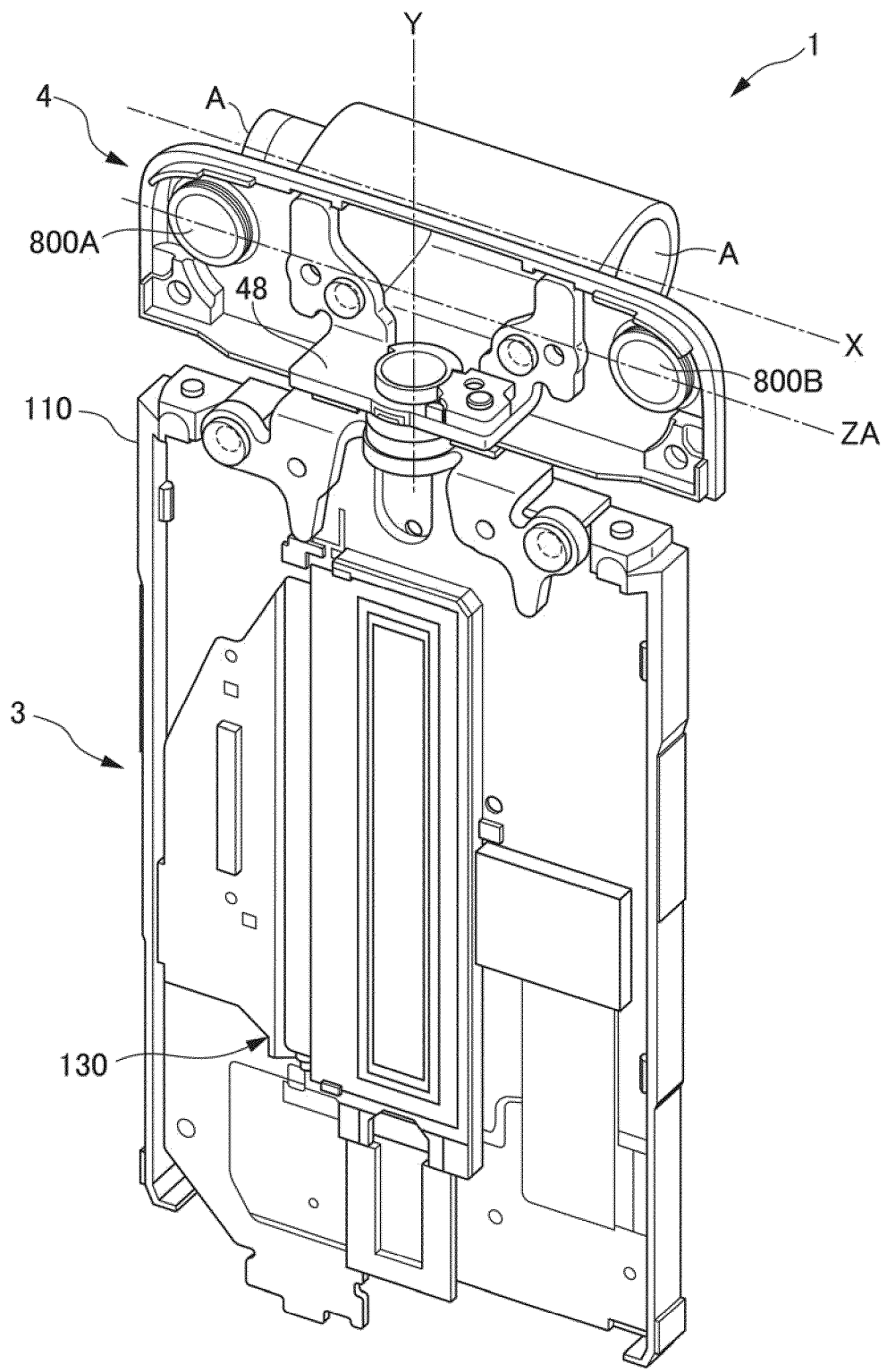
FIG. 9 shows a partially exploded view of the display unit side body 3 and the connecting portion 4.

Next, internal structures of the operation unit side body 2 and the connecting portion 4 are described with reference to FIGS. 8 and 9. FIG. 8 shows an exploded perspective view of the operation unit side body 2. Moreover, FIG. 9 shows a partially exploded view of the display unit side body 3 and the connecting portion 4.

As shown in FIG. 8, the operation unit side body 2 includes: the front case 2a; a key sheet 40 that configures the aforementioned operation key set 11; a flexible printed-circuit board 50 on which key switches are disposed; a shielding case 60; a circuit board 70 including various electronic components such a reference potential pattern layer and an RF (Radio Frequency) module for a cellular telephone device; an antenna portion 80; and the rear case 2b. In addition, the battery 90 is accommodated to be detachable from the outside of the rear case 2b.

The front case 2a and the rear case 2b are disposed such that concave inner surfaces thereof face each other, and are connected such that peripheries thereof superimpose each other. Furthermore, the key sheet 40, the flexible printed-circuit board 50, the shielding case 60, the circuit board 70 and the antenna portion 80 are accommodated and disposed in this order from the front case 2a side between the front case 2a and the rear case 2b.

Various electronic components (not illustrated) are disposed and a reference potential patterned layer (not illustrated) are formed on a first face 72 in the circuit board 70. Moreover, various electronic components are disposed on a second face 73 in the circuit board 70. More specifically, the camera unit 23 and the light unit 24 (not illustrated) are disposed disproportionately to the end portion at the connecting portion 4 side, and the sound input unit 12 (not illustrated) is disposed disproportionately to the end portion at the connecting portion 4 side. It should be noted that the camera unit 23 and the light unit 24 are exposed to the outside via a perforated portion 2c perforated in a predetermined shape in the rear case 2b. Furthermore, a CPU 821, memory 823, a sensor 827 and the like to be described later are mounted on the circuit board 70.

The shielding case 60 is a metal member with a shape in which one large face of a thin right-angled parallelepiped is open. The shielding case 60 has a flat plate portion 42 and ribs 44 that are formed substantially perpendicularly to one face of the flat plate portion 42. The ribs 44 are formed with a height as high as, or sufficiently higher than, the highest electronic component among the various electronic components mounted on the first face 72 in the circuit board 70. It should be noted that, instead of forming the shielding case 60 with metal, the shielding case 60 may be formed with a skeleton formed of a resin, and a metallic conductor film formed on a surface thereof.

Here, the ribs 44 are formed at the periphery and inside of the flat plate portion 42 so as to correspond to the aforementioned reference potential patterned layer. More specifically, in a case in which the first face 72, on which the reference potential patterned layer is formed, and a rear face of the shielding case 60, which is a face on which the ribs 44 are formed, are disposed to face each other, the bottom faces of the ribs 44 are disposed on the reference potential patterned layer.

By way of the ribs 44 (bottom faces), the shielding case 60 is electrically connected to the reference potential patterned layer formed on the first face 72 in the circuit board 70. In this way, the shielding case 60 is electrically connected to the reference potential patterned layer, and has an electric potential that is as high as that of the reference potential patterned layer. Moreover, the shielding case 60 prevents the noise from the outside from affecting the various electronic components (not illustrated) disposed on the first face 72 in the circuit board 70, and absorbs the noise emitted from high frequency circuits and the like formed on the first face 72. Here, such an electrical connection may be accomplished by disposing a conduction member (not illustrated) between the shielding case 60 and the circuit board 70. In addition, the shielding case 60 also functions as a reinforcing member for maintaining rigidity against depressing operations of various keys to be described later.

The flexible printed-circuit board 50 has a plurality of key switches 51, 52 and 53 on the surface of the front case 2a side. The key switches 51, 52 and 53 of the flexible printed-circuit board 50 have a structure of a metal dome made of a metal plate that is three-dimensionally curved like a bowl. When an apex of the bowl-shaped metal dome is depressed, contact is made with a switch terminal formed on an electric circuit (not illustrated) printed on the surface of the flexible printed-circuit board 50, thereby establishing an electrical connection. It should be noted that the flexible printed-circuit board 50 is formed by interposing wirings between a plurality of insulating films.

The key sheet 40 is configured by sticking, with an adhesive, the operation key set 11 on the surface of a sheet 41 made of silicon rubber. The function setting operation keys 13, the input operation keys 14, and the selection operation key 15, which constitute the operation key set 11 in the key sheet 40, are disposed in positions respectively facing the key switches 51, 52 and 53 in the flexible printed-circuit board 50, and are disposed so as to be respectively exposed from key holes 45 formed in the front case 2a to be described later.

A plurality of key holes are formed on the inner surface of the front case 2a, which faces the display 30 of the display unit side body 3 in a state in which the cellular telephone device 1 is folded. Depression faces of the function setting operation keys 13, the input operation keys 14 and the selection keys 15, which are formed on the key sheet 40, are exposed from the plurality of key holes 45, respectively. By pushing so as to depress a depression face of the function setting operation keys 13, the input operation keys 14 and the selection keys 15, which constitute the exposed operation key set 11, an apex of a metal dome (shaped like a bowl) in each of the key switches 51, 52 and 53 is depressed, thereby contacting a switch terminal and establishing an electrical connection.

The antenna unit 80 is configured by disposing an antenna element of a predetermined shape on a base. The antenna unit 80 is disposed to the end portion side that is opposite to the connecting portion 4 side in the cellular telephone device 1. The antenna element of the antenna unit 80 is formed of a belt-shaped sheet metal. Moreover, the antenna unit 80 is fed with power from the circuit board 70 via a feed terminal (not illustrated). As a result, the antenna element is fed with power from the circuit board 70 via the feed terminal, and is connected to RF modules and the like on the circuit board 70.

The battery 90 is detachably accommodated to the battery accommodating portion 92 via the opening 92a formed in the rear case 2b. The battery accommodating portion 92 is formed with the rear case 2b and a part of the second face 73 in the circuit board 70. By disposing the battery lid 25 so as to cover the opening 92a in a state in which the battery 90 is accommodated, it is possible to inhibit the battery 90 from dropping off.

As shown in FIG. 9, the first speaker 800A and the second speaker 800B are accommodated and disposed in the connecting portion 4. The first speaker 800A and the second speaker 800B are accommodated and disposed in both sides in the width direction of the cellular telephone device 1. More specifically, the first speaker 800A and the second speaker 800B are disposed such that a first line ZA connecting the first speaker 800A and the second speaker 800B is parallel with the width direction in the cellular telephone device 1.

Moreover, the first speaker 800A and the second speaker 800B are connected to the circuit board 70 via predetermined wiring. The first speaker 800A and the second speaker 800B receive an output of control data from the CPU 821 mounted on the circuit board 70, and receive an output of a first sound signal that is output as a result of decoding sound data stored in the memory 823 by the decoder 825, thereby producing predetermined sound. It should be noted that a second sound signal is a sound signal as a result of adjusting a frequency characteristic in the first sound signal by an equalizer 834 to be described later. In addition, a third sound signal is a sound signal as a result of adjusting a frequency characteristic in the first sound signal by the equalizer 834, and is different from the second sound signal.

Next, the cradle 900 is described with reference to FIG. 10.

Figure 10:
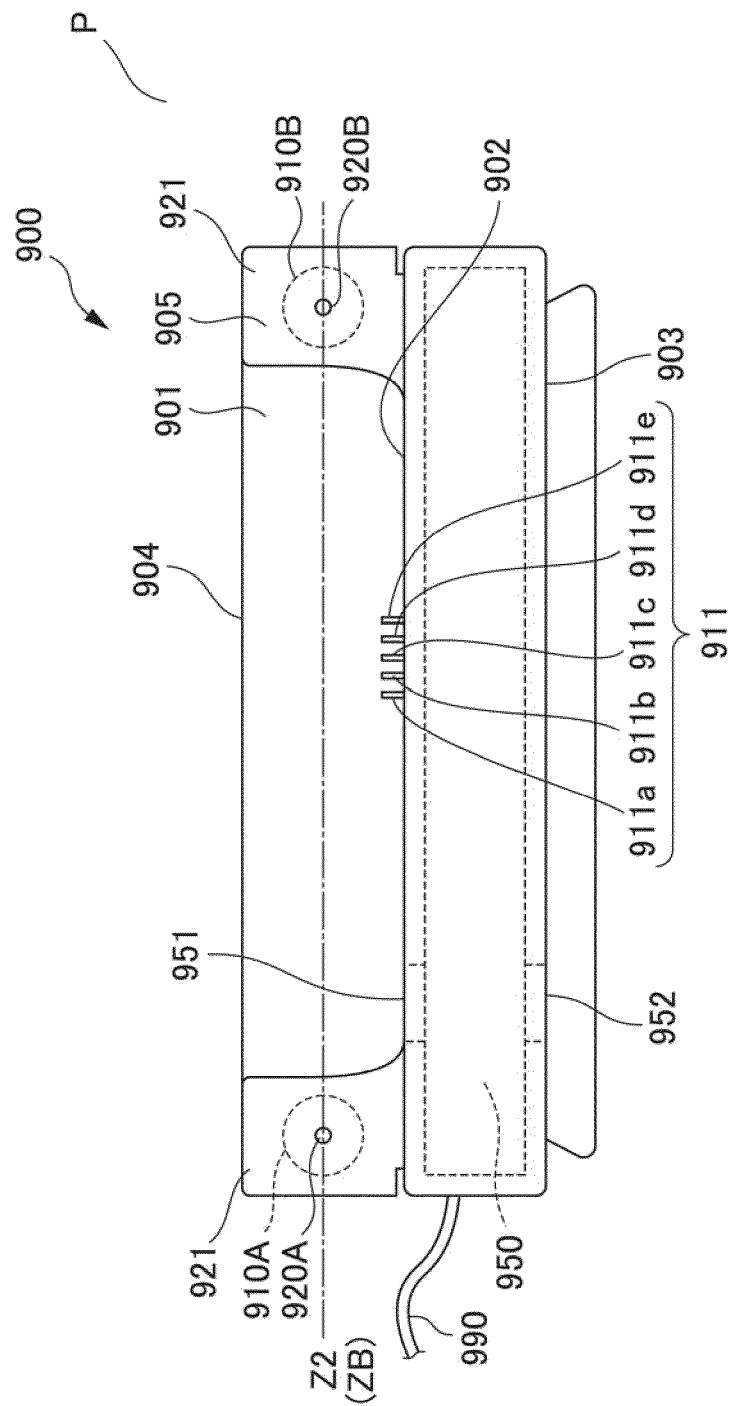
FIG. 10 shows a front view of a cradle 900.

FIG. 10 shows a front view of the cradle 900. As shown in FIG. 10, the cradle 900 includes: a mounting portion 901 on which the cellular telephone device 1 is placed; a power feeding terminal block 911 that is disposed so as to protrude from a mounting face 902 configuring a bottom face of the mounting portion 901; a space portion 950, which communicates from the mounting surface 902 to a bottom face 903 of the cradle 900, and which extends inside the cradle 900; a first cradle side speaker 910A and a second cradle side speaker 910B as a first sound producing unit; and a first cradle side speaker hole 920A and a second cradle side speaker hole 920B. Moreover, the cradle 900 includes a charging cord 990 that is connected to a plug socket (not illustrated).

The mounting portion 901 is a vertically hollow region that is formed to extend from a top face 904 to a side face 905 of the cradle 900, and is a region in which the cellular telephone device 1 can be placed in a state in which the cellular telephone device 1 lies on its side such that the longitudinal direction thereof is parallel with the horizontal direction.

The power feeding terminal block 911 is configured with a feed terminal 911a, a grounding terminal 911b, sound signal input terminals 911c and 911d, and a control data input terminal 911e. The power feeding terminal block 911 is electrically connected to the charging terminal block 19 in a state in which the cellular telephone device 1 is placed. More specifically, the feed terminal 911a and the charging terminal 19a are electrically connected in a state in which the cellular telephone device 1 is placed. In addition, the grounding terminal 911b is electrically connected to the grounding terminal 19b, and the sound signal input terminal 911c is connected to the sound signal output terminal 19c. Furthermore, the sound signal input terminal 911d is connected to the sound signal output terminal 19d. Moreover, the control data input terminal 911e is connected to the control data output terminal 19e. As a result, electric power is charged from the feed terminal 911a to the battery 90 via the charging terminal 19a. In addition, by electrically connecting the grounding terminal 19b and the grounding terminal 911b, an adverse effect due to static electricity is reduced. Furthermore, the second sound signal for the right, which is output from the sound signal output terminal 19c, is output to the first cradle side speaker 910A via the sound signal input terminal 911c. Moreover, the second sound signal for the left, which is output from the sound signal output terminal 19d, is output to the second cradle side speaker 910B via the sound signal input terminal 911d. In addition, the control data, which is output from the control data output terminal 19e, is output to the cradle 900 via the control data input terminal 911e. Control signals, such as for turning on/off an amplifier (not illustrated) disposed in the cradle 900, are output from the control data output terminal 19e to the cradle 900. Here, the control data includes first correction parameters as frequency characteristic correction data to be described later.

The first cradle side speaker 910A and the second cradle side speaker 910B are respectively disposed in both sides of the horizontal direction of the cradle 900 so as to be spaced apart from each other. The first cradle side speaker 910A and the second cradle side speaker 910B are disposed such that a second line Z2 obtained by projecting a line ZB on a plane P to be described later is parallel with the horizontal direction, in which the line ZB connects the first cradle side speaker 910A and the second cradle side speaker 910B.

The first cradle side speaker hole 920A and the second cradle side speaker hole 920B are respectively formed in wall portions 921 that are disposed in a front side of the first cradle side speaker 910A and the second cradle side speaker 910B in FIG. 10, respectively. The sound respectively produced by the first cradle side speaker 910A and the second cradle side speaker 910B are emitted to the outside space from the first cradle side speaker hole 920A and the second cradle side speaker hole 920B, respectively. In addition, sound of the first channel is emitted from the first cradle side speaker 910A, and sound of the second channel is emitted from the second cradle side speaker 910B, thereby forming a predetermined stereophonic playback sound space.

The space portion 950 is formed so as to connect a first opening 951 formed in the mounting surface 90 and a second opening 952 formed in the bottom face 903. The space portion 950 functions as a resonance tube. The first opening 951 is formed in a position in the vicinity of the first speaker hole 810A in a state in which the cellular telephone device 1 is placed. The second opening 952 is formed in a predetermined position in the bottom face 903. Here, the position of the second opening 952 is not particularly limited as long as it is exposed to the outside space, and the second opening 952 may be formed in a side face or a back face. In a case in which music is played in a state in which the cellular telephone device 1 is placed on the mounting portion 901, sound produced by the first speaker 800A is emitted from the first speaker hole 810A, and the sound thus emitted is propagated into the space portion 950 via the first opening 951. The sound propagated into the space portion 950 is emitted from the second opening 953 to the outside space, while resonating.

Figure 11:
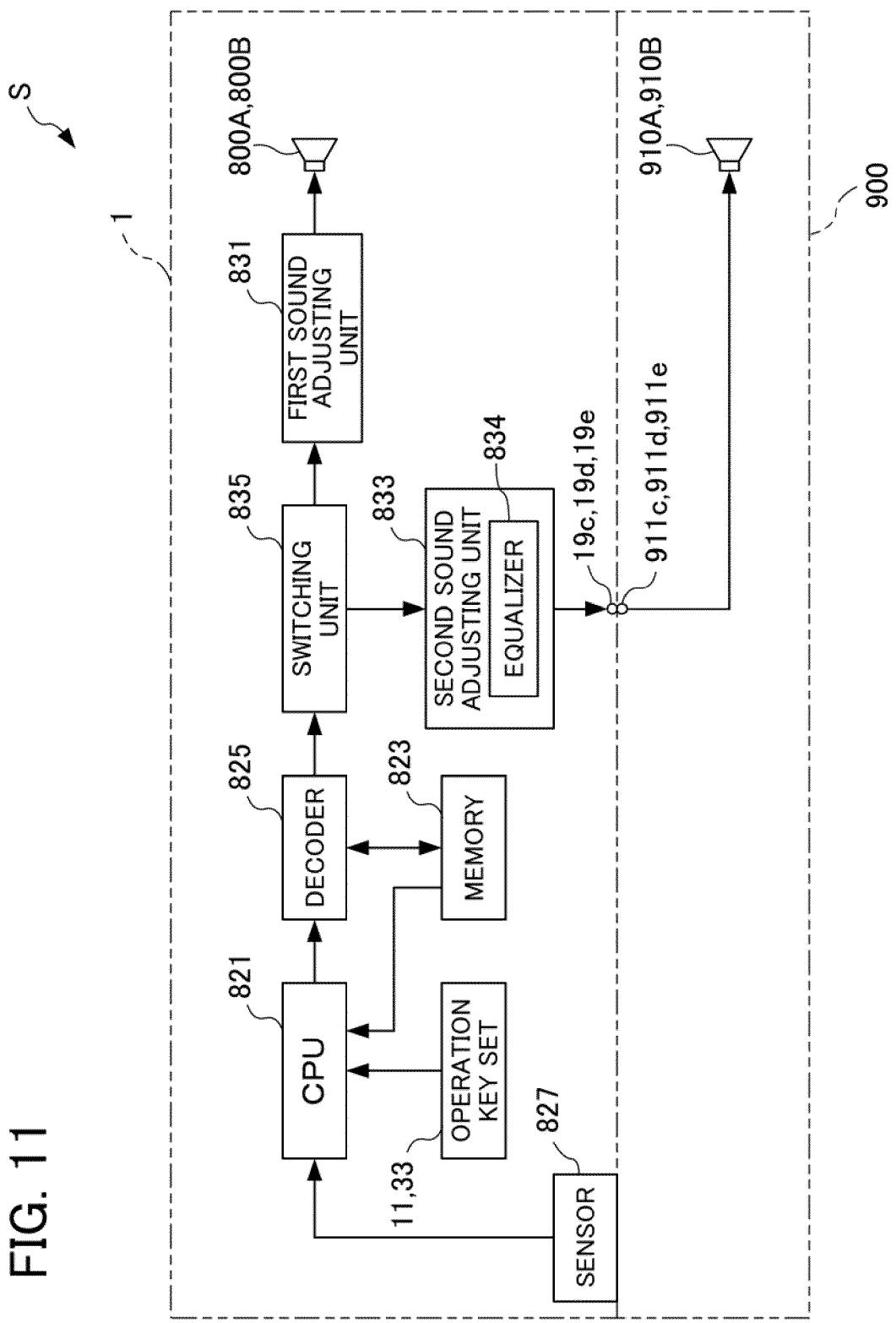
FIG. 11 shows a block diagram illustrating a configuration of the sound system S1.

Next, a configuration of the sound system S1 is described with reference to FIG. 11. FIG. 11 shows a block diagram illustrating the configuration of the sound system S1. As shown in FIG. 11, the sound system S1 has the cellular telephone device 1 and the cradle 900.

The cellular telephone device 1 includes the operation key sets 11 and 33, the CPU 821, the memory 823 as a memory unit, the decoder 825 as a converter, the sensor 827 as a detecting unit and an identifying unit, a first sound adjusting unit 831, a second sound adjusting unit 833, a switching unit 835, the first speaker 800A and the second speaker 800B, the sound signal output terminals 19c and 19d as an output unit, and the control data output terminal 19e. Here, as described later, the memory 823 stores sound data, and also stores the first correction parameters as frequency characteristic correction data corresponding to a plurality of types of cradles. Moreover, the second sound adjusting unit 833 includes the equalizer 834 as a sound signal generating unit being capable of adjusting a frequency characteristic of a sound signal.

The cradle 900 includes: the first cradle side speaker 910A and the second cradle side speaker 910B disposed so as to be spaced apart from each other in the horizontal direction; the sound signal input terminals 911c and 911d into which the second output sound signal is input from the cellular telephone device 1 side; and the control data input terminal 911e into which output control data is input from the CPU 821.

In the sound system S1, in a state in which the cellular telephone device 1 is placed on the cradle 900, the sound signal output terminals 19c and 19d are electrically connected to the sound signal input terminals 911c and 911d, respectively, and the control data output terminal 19e is electrically connected to the control data input terminal 911e. In addition, in the sound system S1, in a state in which the cellular telephone device 1 is placed on the cradle 900, the charging terminal 19a and the feed terminal 911a (not illustrated in FIG. 11) are electrically connected to each other. Each component is hereinafter described.

The operation key sets 11 and 33 are capable of designating a selection of music and a volume level of music, and are also capable of fast forwarding and rewinding music that is being played.

The memory 823 stores encoded sound data of music. The memory 823 outputs encoded sound data to the decoder 825 based on an instruction from the CPU 821. Furthermore, the memory 823 stores the first correction parameters as frequency characteristic correction data corresponding to a plurality of types of cradles. The first correction parameters are stored in association with identifying signals indicating types of cradles. The first correction parameter is output to the equalizer 834 based on an instruction from the CPU 821.

The first correction parameters are used when the equalizer 834 to be described later corrects a frequency characteristic of the first sound signal. The first correction parameters are set such that the sound quality of sound produced based on the first sound signal from the first speaker 800A and the second speaker 800B as a second sound producing unit approximates to, or more specifically is substantially identical to, the sound quality of sound produced based on the second sound signal from the first cradle side speaker 910A and the second cradle side speaker 910B as a first sound producing unit. The first correction parameters can be set, for example, by measuring the sound quality of sound produced from the first speaker 800A and the second speaker 800B based on the first sound signal and the sound quality of sound produced from the first cradle side speaker 910A and the second cradle side speaker 910B based on the second sound signal, and calculating the difference between the sound quality of the two sound above to be used as reference for the setting.

Figure 14:
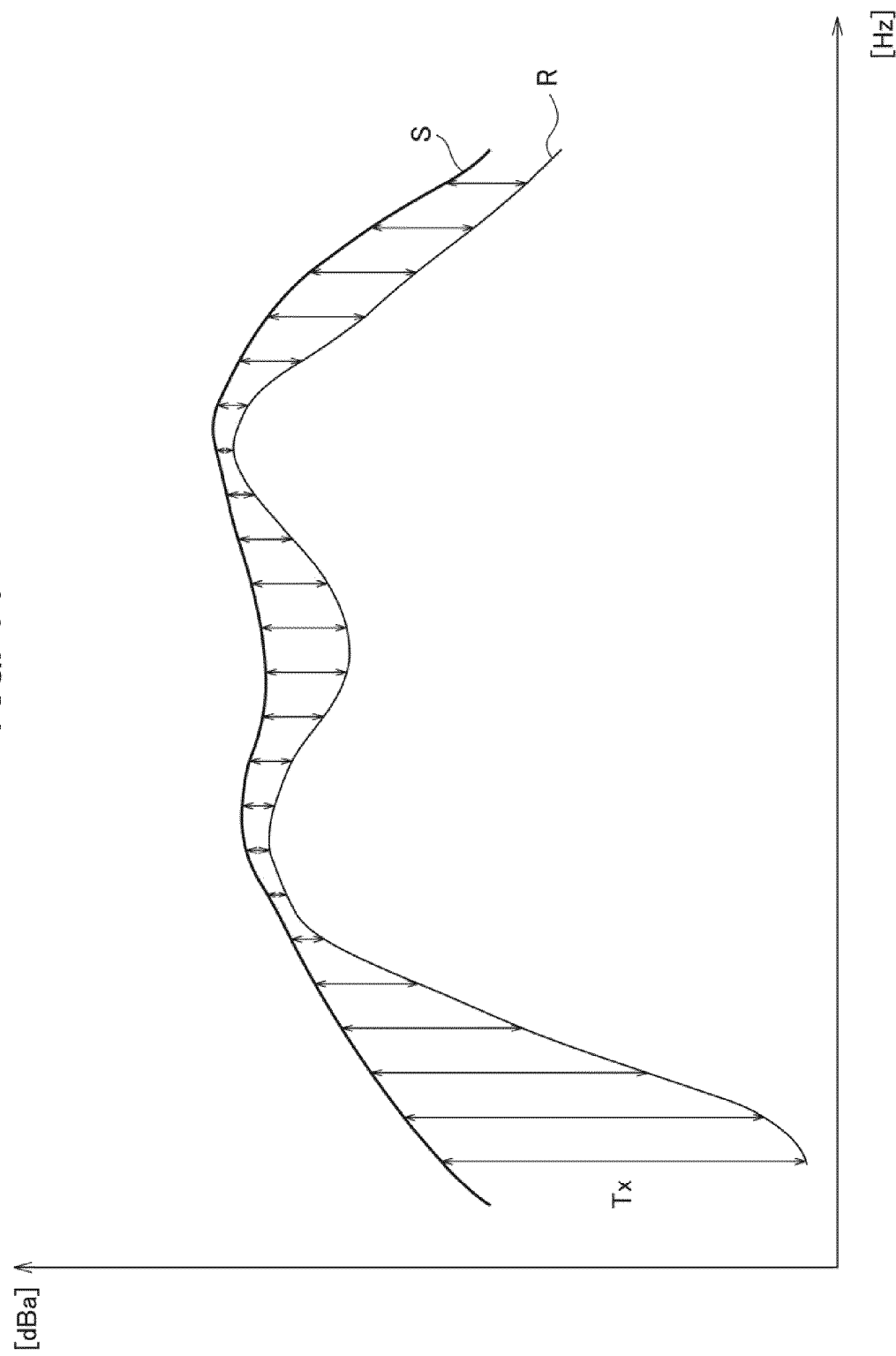
FIG. 14 is a graph showing a frequency characteristic in speakers on the cellular telephone device 1 side and a frequency characteristic in speakers on the cradle 900 side.

Here, the setting of the first correction parameters is further described with reference to a graph shown in FIG. 14. FIG. 14 is a graph showing a frequency characteristic in the speakers on the cellular telephone device 1 side and a frequency characteristic in the speakers on the cradle 900 side. As shown in FIG. 14, a curve R is a frequency characteristic of sound output from the cellular telephone device 1, and a curve S is a frequency characteristic of sound output from the cradle 900. A difference Tx of the curve S and the curve T in a predetermined frequency can be set as the first correction parameters. Here, it is possible to set the first correction parameters so as to enable correction of a low-pitched range in which the difference between the curve S and the curve T is large.

The memory 823 further stores a second correction parameter for adjusting a frequency characteristic of the first sound signal such that the sound quality of sound produced from the first cradle side speaker 910A and the second cradle side speaker 910B becomes a preferable sound quality. By adjusting a frequency characteristic of the first sound signal based on the second correction parameter with the equalizer 834, the third sound signal is obtained.

As a converter, the decoder 825 decodes sound data output from the memory 823, and converts it into the first sound signal. The first sound signal is output to the switching unit 835. The first sound signal is output to the first sound adjusting unit 831 or the second sound adjusting unit 833. The first sound signal, which is output to the first sound adjusting unit 831, is output as a predetermined sound from the first speaker 800A and the second speaker 800B. The first sound signal, which is output to the second sound adjusting unit 833, and of which a frequency characteristic is adjusted by the equalizer 834, is then output as the second sound signal. The second sound signal is output as a predetermined sound from the first cradle side speaker 910A and the second cradle side speaker 910B via the sound signal output terminals 19c and 19d as an output unit and the sound signal input terminals 911c and 911d.

The CPU 821 outputs predetermined control data to the memory 823, the decoder 825, the switching unit 835, the first sound adjusting unit 831, and the second sound adjusting unit 833. Examples of the control data can include: data of a sound volume level setting value for setting loudness of sound emitted from each speaker; data for designating an output destination of sound data and the like in the switching unit 835; data of a sound range setting value for designating a range of sound produced by each speaker; the first correction parameters as frequency characteristic correction data that is output from the memory 823 as a memory unit; and the like.

In a case in which the CPU 821 receives a detection signal and an identifying signal from the sensor 827, the CPU 821 outputs predetermined control data. More specifically, in a case in which the CPU 821 receives a detection signal, the CPU 821 outputs, to the equalizer 834, control data including an instruction for correcting a frequency characteristic in the first sound signal based on the first correction parameters. Furthermore, in a case in which the CPU 821 receives a detection signal, the CPU 821 outputs, to the switching unit 835, control data including an instruction for switching an output destination of the first sound signal from the first sound adjusting unit 831 on the speaker 800A side and the second speaker 800B side to the second sound adjusting unit 833 on the first cradle side speaker 910A side and the second cradle side speaker 910B side. In addition, in a case in which the CPU 821 receives an identifying signal, the CPU 821 outputs, to the memory 823, control data including an instruction for causing the equalizer 834 to output a correction parameter corresponding to a type of cradle identified by way of the identifying signal. Upon receiving this control data, the equalizer 834 adjusts a frequency characteristic of the first sound signal based on the first correction parameter that is output from the memory 823. The equalizer 834 outputs the second sound signal of which a frequency characteristic is different from that of the first sound signal. The second sound signal is then output to the cradle 900 side via the sound signal output terminals 19c and 19d and the sound signal input terminals 911c and 911d. The first cradle side speaker 910A and the second cradle side speaker 910B produce sound based on the second sound signal.

Furthermore, after the first cradle side speaker 910A and the second cradle side speaker 910B output sound based on the second sound signal, the CPU 821 outputs, to the memory 823, control data including an instruction that causes the equalizer 834 to output the second correction parameter. Here, the CPU 821 outputs, to the equalizer 834, control data including an instruction that causes a frequency characteristic of the second sound signal to gradually change to that of the third sound signal by taking a predetermined period of time. As a result, the sound quality of sound produced from the first cradle side speaker 910A and the second cradle side speaker 910B based on the second sound signal gradually changes to a preferable sound quality of sound that is produced based on the third sound signal. Here, although the gradual change of the sound quality refers to a step-wise change of the sound quality since the data that is output from the CPU 821 is digital data, such a change may be considered to be continuous as long as an amount of each step-wise change is small.

The switching unit 835 outputs the first sound signal and control data to the first sound adjusting unit 831 and/or the second sound adjusting unit 833 based on an instruction from the CPU 821. In a state in which the cellular telephone device 1 is not placed on the cradle 900, the switching unit 835 causes the first sound adjusting unit 831 to output the first sound signal. In addition, in a state in which the cellular telephone device 1 is placed on the cradle 900, the switching unit 835 causes the second sound adjusting unit 833 to output the first sound signal based on an instruction from the CPU 821. More specifically, the switching unit 835 switches an output destination of the first sound signal from the first speaker 800A side and the second speaker 800B side (of the cellular telephone device 1) to the first cradle side speaker 910A side and the second cradle side speaker 910B side (of the cradle 900).

The first sound adjusting unit 831 causes the first speaker 800A and the second speaker 800B to emit sound of a predetermined sound quality based on the first sound signal and the control data. More specifically, the first speaker 800A and the second speaker 800B are caused to emit sound of music based on sound data, at a volume level based on a sound volume level setting value included in the control data. In a case in which the switching unit 835 switches the first sound signal to be output to the second sound adjusting unit 833, the first sound adjusting unit 831 stops emitting sound from the first speaker 800A and the second speaker 800B.

The second sound adjusting unit 833 is configured with the equalizer 834. The equalizer 834 adjusts a frequency characteristic in the first sound signal from the switching unit 835. More specifically, the equalizer 834 adjusts a frequency characteristic of the first sound signal based on the first correction parameters or the second correction parameter as frequency characteristic correction data that is output from the memory 823.

The equalizer 834 adjusts a frequency characteristic of the first sound signal based on the first correction parameters, and also outputs the second sound signal that is an adjusted signal. More specifically, the equalizer 834 adjusts a frequency characteristic of the first sound signal based on the first correction parameter corresponding to the type of the cradle 900, which is output from the memory 823. Particularly, the equalizer 834 adjusts a frequency characteristic such that an output in the low-pitched range in the first sound signal is reduced. In other words, even in a case in which the sound signals are identical, the output level in the low-pitched range by the first cradle side speaker 910A and the second cradle side speaker 910B on the cradle 900 side is higher as compared to that by the first speaker 800A and the second speaker 800B on the cellular telephone device 1 side; therefore, an output level in the low-pitched range in the second sound signal is reduced in advance. Here, the low-pitched range is from 20 Hz to 700 Hz, a middle-pitched range is from 700 Hz to 5 KHz, and a high-pitched range is from 5 KHz to 20 KHz. It should be noted that the above numeric values are examples, and numeric values in each range may be different from the above numeric values in some cases.

The equalizer 834 adjusts a frequency characteristic of the first sound signal based on the second correction parameter, and also outputs the third sound signal, which is an adjusted signal. More specifically, the equalizer 834 adjusts a frequency characteristic of the first sound signal based on the second correction parameter corresponding to the type of the cradle 900 that is output from the memory 823. Here, instead of rapidly changing the second sound signal to the third sound signal, the equalizer 834 gradually changes a frequency characteristic of the first sound signal based on an instruction from the CPU 821 such that the second sound signal gradually changes to the third sound signal.

The second sound adjusting unit 833 causes the first cradle side speaker 910A and the second cradle side speaker 910B to emit sound of a predetermined sound quality based on the second sound signal and the control data. The sound quality of sound that is output from the second sound adjusting unit 833 based on the second sound signal and produced from the first cradle side speaker 910A and the second cradle side speaker 910B is substantially identical to the sound quality of sound that is output from the first sound adjusting unit 831 based on the first sound signal and produced from the first speaker 800A and the second speaker 800B.

The second sound adjusting unit 833 causes the first cradle side speaker 910A and the second cradle side speaker 910B to emit sound of a predetermined sound quality based on the third sound signal and the control data. The sound quality of sound that is output from the second sound adjusting unit 833 based on the third sound signal and produced from the first cradle side speaker 910A and the second cradle side speaker 910B is a sound quality to form a preferable sound space. Here, as described above, since the second sound signal changes to the third sound signal over time, the sound quality of sound produced from the first cradle side speaker 910A and the second cradle side speaker 910B is changed over time from the sound quality of sound produced from the cellular telephone device 1 side to a sound quality of sound to form a preferable sound space.

The sensor 827 detects that the cellular telephone device 1 is placed on the cradle 900, and identifies a type of the cradle 900.

The sensor 827 detects that predetermined electric power is supplied from the feed terminal 911a via the charging terminal 19a, thereby detecting that the cellular telephone device 1 is placed on the cradle 900. In a case in which the sensor 827 detects that the cellular telephone device 1 is placed on the cradle 900, the sensor 827 outputs a detection signal informing the CPU 821 of the detection.

Moreover, by detecting a voltage difference in the control data between the cellular telephone device 1 and the cradle 900, the sensor 827 identifies a type of the cradle 900. In a case in which the sensor 827 identifies a type of the cradle 900, the sensor 827 outputs an identifying signal indicating the type of the cradle 900 to the CPU 821.

Figure 12A:
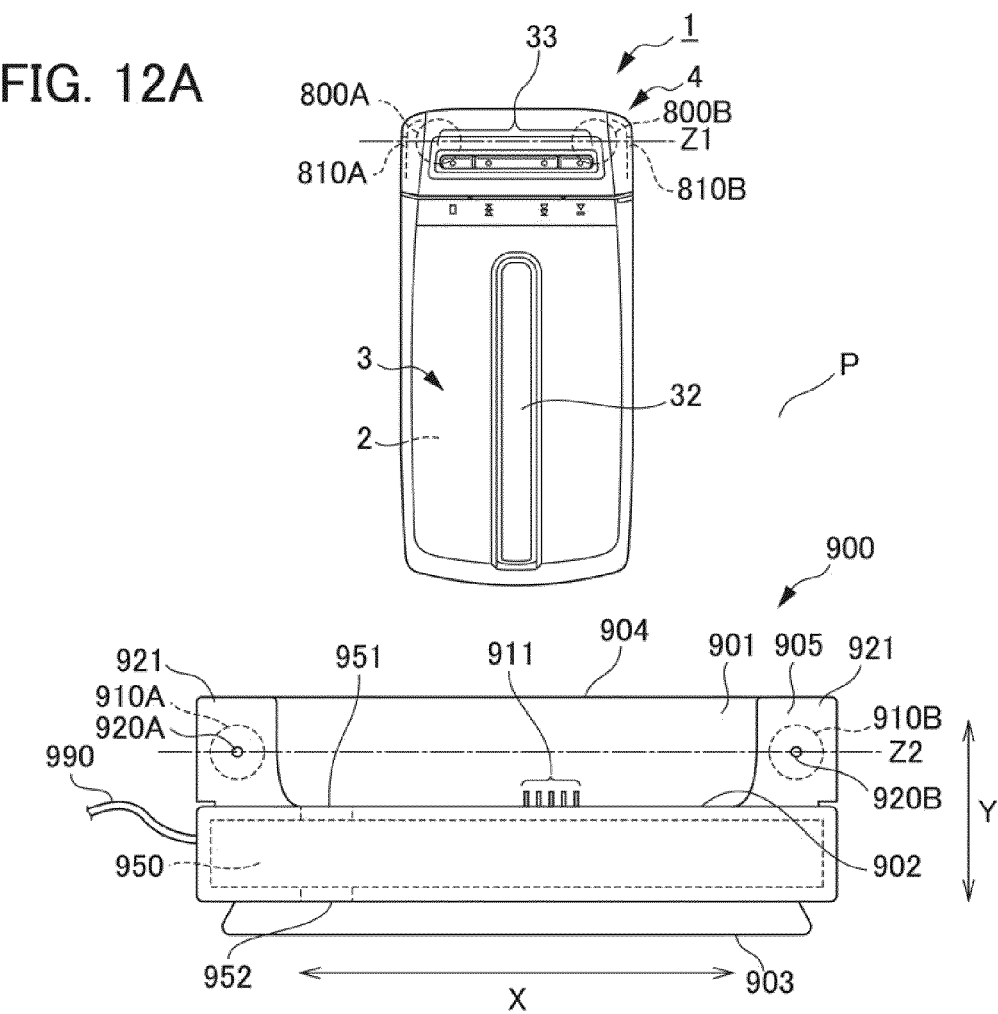
FIG. 12A shows a front view illustrating each aspect of the sound system S1.
Figure 12B:
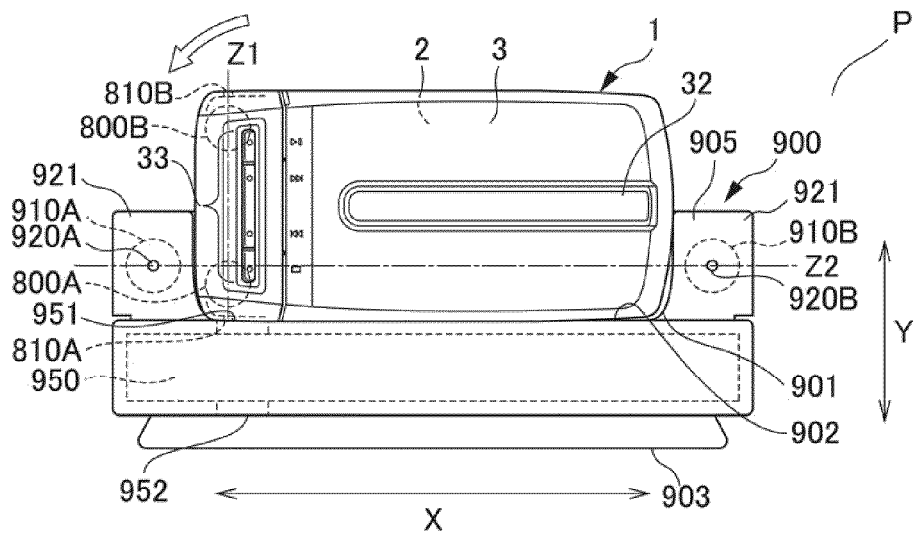
FIG. 12B shows a front view illustrating each aspect of the sound system S1.

Next, operations of the sound system S1 are described with reference to FIGS. 12A to 13. FIGS. 12A and 12B respectively show a front view illustrating each aspect of the sound system S1. FIG. 13 shows a flowchart illustrating one aspect of operation of the sound system S1.

First, in the state shown in FIG. 2, predetermined music is selected from a music list displayed on the display 30 by way of the operation key set 11, and playback is instructed (ST1). As a result, the sound of music with a predetermined sound quality is emitted from the first speaker 800A and the second speaker 800B based on the first sound signal (ST2).

Subsequently, in the first closed state shown in FIGS. 5 and 12A in which the cellular telephone device 1 is folded, the emission of sound from the first speaker 800A and the second speaker 800B is continued (ST3). More specifically, in a state in which a first line Z1, which is obtained by projecting the line ZA on a predetermined plane P (a plane parallel with the front in FIGS. 12A and 12B) parallel with the line ZA, is parallel with a horizontal direction X, the playback is continued, in which the line ZA connects the first speaker 800A and the second speaker 800B. In this state, the first channel's sound produced from the first speaker 800A is emitted from the first speaker hole 810A to the outside, and the second channel's sound produced from the second speaker 800B is emitted from the second speaker hole 810B to the outside, thereby forming a sound space as stereophonic playback.

Subsequently, as shown in FIG. 12B, the cellular telephone device 1 is horizontally placed on the cradle 900 such that the first line Z1 is parallel with a vertical direction Y (ST4). In a state in which the cellular telephone device 1 is placed on the cradle 900 in this way, the first line Z1 is orthogonal to the second line Z2 that is obtained by projecting the line ZB on the plane P.

By placing the cellular telephone device 1 on the cradle 900, the charging terminal block 19 and the power feeding terminal block 911 are electrically connected (ST5). In addition, the sensor 827 detects that the cellular telephone device 1 is placed on the cradle 900, and identifies a type of the cradle 900 (ST6). The sensor 827 outputs a detection signal and an identifying signal to the CPU 821.

The CPU 821 instructs the switching unit 835 to switch an output destination of the first sound signal from the first sound adjusting unit 831 to the second sound adjusting unit 833 (ST7).

Moreover, the CPU 821 instructs the memory 823 to output the first correction parameters to the equalizer 834 (ST8). More specifically, the CPU 821 instructs the equalizer 834 to output the first correction parameter corresponding to the type of the cradle 900 specified by the identifying signal.

In addition, the CPU 821 instructs the equalizer 834 to adjust a frequency characteristic of the first sound signal based on the first correction parameter (ST9). In other words, the CPU 821 instructs the equalizer 834 to adjust a frequency characteristic of the first sound signal based on the first parameter and to output the second sound signal.

The switching unit 835 switches an output destination of the first sound signal from the first sound adjusting unit 831 to the second sound adjusting unit 833 (ST10). In addition, the equalizer 834 included in the second sound adjusting unit 833 corrects a frequency characteristic of the first sound signal based on the first correction parameter, and outputs the second sound signal (ST11).

A signal for the right in the second sound signal is input into the first cradle side speaker 910A via the sound signal output terminal 19c and the sound signal input terminal 911c. Furthermore, a signal for the left in the second sound signal is input into the second cradle side speaker 910B via the sound signal output terminal 19d and the sound signal input terminal 911d. In addition, the first cradle side speaker 910A and the second cradle side speaker 910B emit sound based on the second sound signal (ST12). Here, the sound quality of sound emitted from the first cradle side speaker 910A and the second cradle side speaker 910B based on the second sound signal is substantially identical to the sound quality of sound emitted from the first speaker 800A and the second speaker 800B based on the first sound signal. This makes it possible to switch an output of sound from the cellular telephone device 1 side to the cradle 900 side without causing a listener such as a user to feel discomfort due to the change of the sound quality.

The CPU 821 instructs the memory 823 to output the second correction parameter to the equalizer 834 (ST13). More specifically, the CPU 821 instructs the equalizer 834 to output the second correction parameter corresponding to the type of the cradle 900 specified by the identifying signal.

Moreover, the CPU 821 instructs the equalizer 834 to perform a change over time from the adjustment of a frequency characteristic by way of the first correction parameters to the adjustment of a frequency characteristic by way of the second correction parameter (ST14). In other words, the CPU 821 instructs the equalizer 834 to change a sound signal, which is output from the equalizer 834, from the second sound signal to the third sound signal, and to perform the change over time from the second sound signal to the third sound signal.

As a result, the sound quality of sound emitted from the first cradle side speaker 910A and the second cradle side speaker 910B changes over time (ST15). In addition, after a predetermined period of time has passed, the first cradle side speaker 910A and the second cradle side speaker 910B emit the sound of music constituted with sound of a sound quality to form a preferable sound space, based on the third sound signal.

According to the present embodiment, in a case in which sound production is switched from the cellular telephone device 1 side to the cradle 900 side, the sound quality of sound emitted from the first cradle side speaker 910A and the second cradle side speaker 910B on the cradle 900 side can approximate to the sound quality of sound emitted from the first speaker 800A and the second speaker 800B on the cellular telephone device 1 side; therefore, it is possible to switch sound production from the cellular telephone device 1 side to the cradle 900 side without causing a listener such as a user to feel discomfort.

Moreover, according to the present embodiment, after changing sound production from the cellular telephone device 1 side to the cradle 900 side, the sound quality of sound produced from the first cradle side speaker 910A and the second cradle side speaker 910B on the cradle 900 side can be changed to a sound quality that is capable of forming a preferable sound space, without causing a listener such as a user to feel discomfort. Here, since the change of the sound quality can be made over time, i.e. step-wise or continuously, it is possible to form a preferable sound space without causing a listener such as a user to feel discomfort. In other words, according to the present embodiment, sound production can be switched from the cellular telephone device 1 side to the cradle 900 side without causing a listener such as a user to feel discomfort, and a preferable sound space can be formed.

Although a preferable embodiment is described above, the present invention is not limited to the abovementioned embodiment, and it may be implemented in various embodiments. Although the memory 823 outputs the first correction parameter corresponding to a type of the cradle 900 specified by an identifying signal from the sensor 827 in the present embodiment, it is not limited thereto, and in a case in which there is one type of the cradle 900 on which the cellular telephone device 1 can be placed, it may be configured such that the first correction parameter is automatically output in a case in which the cellular telephone device 1 is placed.

In addition, although the first correction parameters and the second correction parameter are stored in the memory 823 in the present embodiment, they are not limited thereto, and they may be stored in the cradle 900 side. The first correction parameters and the second correction parameter may be stored in the memory 823 in advance, may be read from an external storage medium, or may be downloaded from a network and stored in the memory 823. In addition, a configuration may be employed in which, in a case in which the cellular telephone device 1 is placed on the cradle 900, the first correction parameter is output from the cradle 900 side to the equalizer 834 on the cellular telephone device 1 side.

Furthermore, although an output destination of the first sound signal is changed from the first sound adjusting unit 831 to the second sound adjusting unit 833 in a case in which the cellular telephone device 1 is placed in the present embodiment, it is not limited thereto, and such switching may be performed so as to include a period of time in which both of the first sound adjusting unit 831 and the second sound adjusting unit 833 are output destinations of the first sound signal. In this period of time as well, the sound quality of sound emitted from the first speaker 800A and the second speaker 800B on the cellular telephone device 1 side based on the first sound signal approximates to the sound quality of sound emitted from the first cradle side speaker 910A and the second cradle side speaker 910B on the cradle 900 side; therefore, it is possible to suppress causing a listener such as a user to feel discomfort.

Moreover, although an equalizer is used as a sound signal generating unit in the present embodiment, it is not limited thereto, and another device or program that is capable of adjusting a frequency characteristic of the sound signal may be used.

The invention claimed is:

1. An electronic device comprising:
a body that can be placed on a cradle including a first sound producing unit that produces a sound based on a sound signal, wherein the first sound producing unit includes two speakers aligned horizontally;
a converter that converts sound data into a first sound signal;
a second sound producing unit that produces a sound based on the first sound signal, wherein the second sound producing unit includes a first speaker and a second speaker;
a sound signal generating unit that generates a second sound signal based on the first sound signal;
an output unit that can be electrically connected to the cradle when the body is placed on the cradle, and that outputs the second sound signal to the cradle, wherein the sound signal generating unit generates the second sound signal by adjusting a frequency characteristic in a partial frequency range of the first sound signal such that a sound quality of sound produced from the first sound producing unit approximates to a sound quality of sound produced from the second sound producing unit based on the first sound signal; and
a switching unit that outputs the first sound signal to the second sound producing unit when the body is placed in the cradle such that a straight line connecting the first speaker and the second speaker is horizontal, and outputs the second sound signal to the first sound producing unit when the body is placed in the cradle such that the straight line connecting the first speaker and the second speaker is orthogonal to horizontal.

2. The electronic device according to claim 1, wherein the sound signal generating unit generates the second sound signal such that the sound quality of sound produced from the first sound producing unit based on the second sound signal is substantially identical to the sound quality of sound produced from the second sound producing unit based on the first sound signal.

3. The electronic device according to claim 1, wherein the sound signal generating unit generates the second sound signal such that a low-pitched output in the first sound signal is reduced.

4. The electronic device according to claim 1, wherein, after the second sound signal is output to the first sound producing unit from the output unit, the sound signal generating unit adjusts the first sound signal and produces a third sound signal that is different from the second sound signal.

5. The electronic device according to claim 4, wherein the sound signal generating unit adjusts the first sound signal such that a change from the second sound signal to the third sound signal is step-wise or continuous.

6. The electronic device according to claim 1, further comprising a memory unit that stores characteristic correction data, wherein the sound signal generating unit generates the second sound signal by correcting, the first sound signal based on the characteristic correction data stored in the memory unit.

7. The electronic device according to claim 6, further comprising an identifying unit that identifies a type of cradle on which the electronic device is placed, wherein the memory unit stores characteristic correction data corresponding to at least one type of cradle, and wherein, in a case in which a type of cradle, on which the electronic device is placed, is identified by the identifying unit, the sound signal generating unit generates the second sound signal by correcting the first sound signal based on the characteristic correction data, which is stored in the memory unit and corresponds to a type of cradle identified by the identifying unit.

8. The electronic device according to claim 1, further comprising a detecting unit that is capable of detecting that the electronic device is placed on the cradle, wherein, in a case in which the detecting unit detects that the electronic device is placed on the cradle, the sound signal generating unit generates the second sound signal based on the first sound signal, the second sound producing unit stops producing sound based on the first sound signal, and the output unit starts output of the second sound signal to the cradle.

9. The electronic device according to claim 4, further comprising a memory unit that stores characteristic correction data, wherein the sound signal generating unit generates the third sound signal by correcting the first sound signal based on the characteristic correction data stored in the memory unit.

10. The electronic device according to claim 9, further comprising an identifying unit that identifies a type of cradle on which the electronic device is placed, wherein the memory unit stores characteristic correction data corresponding to at least one type of cradle, and wherein, in a case in which a type of cradle, on which the electronic device is placed, is identified by the identifying unit, the sound signal generating unit generates the third sound signal by correcting the first sound signal based on the characteristic correction data, which is stored in the memory unit and corresponds to a type of cradle identified by the identifying unit.

* * * * *